United States Patent
Shao et al.

(10) Patent No.: US 12,243,149 B2
(45) Date of Patent: Mar. 4, 2025

(54) GRAPHICS PROCESSING

(71) Applicant: Arm Limited, Cambridge (GB)

(72) Inventors: Wei Shao, Cambridge (GB); Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 176 days.

(21) Appl. No.: 18/184,094

(22) Filed: Mar. 15, 2023

(65) Prior Publication Data

US 2023/0298249 A1    Sep. 21, 2023

(30) Foreign Application Priority Data

Mar. 15, 2022 (GB) ..................................... 2203563

(51) Int. Cl.
| | |
|---|---|
| *G06T 15/00* | (2011.01) |
| *G06T 11/40* | (2006.01) |
| *G06T 15/80* | (2011.01) |

(52) U.S. Cl.
CPC ............ *G06T 15/005* (2013.01); *G06T 11/40* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 2007/0146378 A1 | 6/2007 | Sorgard et al. | |
| 2009/0073177 A1 | 3/2009 | Jiao et al. | |
| 2010/0302246 A1* | 12/2010 | Jiao | G06T 15/40 345/506 |
| 2012/0223947 A1 | 9/2012 | Nystad et al. | |
| 2014/0354654 A1* | 12/2014 | Heggelund | G06T 1/20 345/501 |
| 2014/0368521 A1* | 12/2014 | Lassen | G06T 15/005 345/530 |
| 2016/0042560 A1* | 2/2016 | Chang | G06T 1/20 345/426 |
| 2016/0086299 A1 | 3/2016 | Sharma et al. | |

(Continued)

FOREIGN PATENT DOCUMENTS

| | | |
|---|---|---|
| GB | 2527822 | 1/2016 |
| GB | 2546073 | 7/2017 |

OTHER PUBLICATIONS

Combined Search and Examination Report dated Sep. 7, 2022, GB Patent Application No. GB2203563.8.

(Continued)

*Primary Examiner* — Tapas Mazumder
(74) *Attorney, Agent, or Firm* — Pearl Cohen Zedek Latzer Baratz LLP

(57) ABSTRACT

When performing tile-based graphics processing, a first vertex shading operation to generate vertex shaded position data for vertices is performed, and the vertex shaded position data used to prepare primitive lists indicating which primitives should be rendered for respective rendering tiles. Then, when processing a tile, a second vertex shading operation is performed for vertices of primitives for the tile for which fragments have been generated by a rasteriser prior to rendering the graphics fragments, to generate vertex shaded non-position attribute data for the vertices, based on the results of early depth testing before the fragments are rendered.

20 Claims, 9 Drawing Sheets

(56) References Cited

U.S. PATENT DOCUMENTS

2019/0130635 A1    5/2019    Ramadoss et al.
2020/0193703 A1    6/2020    Favela et al.

OTHER PUBLICATIONS

Non-Final Office Action dated Jan. 12, 2017, U.S. Appl. No. 14/790,452.
Response to Non-Final Office Action dated May 5, 2017, U.S. Appl. No. 14/790,452.
Notice of Allowance dated Jun. 13, 2017, U.S. Appl. No. 14/790,452.
Search Report dated Jan. 9, 2015, GB Patent Application No. GB1411892.1.
Non-Final Office Action dated Mar. 22, 2018, U.S. Appl. No. 15/393,120.
Response to Non-Final Office Action dated Sep. 19, 2018, U.S. Appl. No. 15/393,120.
Notice of Allowance dated Nov. 21, 2018, U.S. Appl. No. 15/393,120.
Combined Search and Examination Report dated Mar. 22, 2016, GB Patent Application No. GB1600144.8.
Engh-Halstvedt et al., "Graphics Processing", U.S. Appl. No. 14/790,452, filed Jul. 2, 2015.
Langtind et al., "Graphics Processing", U.S. Appl. No. 15/393,120, filed Dec. 28, 2016.

\* cited by examiner

GRAPHICS PROCESSING

BACKGROUND

The technology described herein relates to graphics processing, and in particular to the operation of graphics processing pipelines that perform vertex shading.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output.

The rasterising and rendering processes use the vertex attributes associated with the vertices of the primitives that are being processed. To facilitate this operation, the vertices defined for the given graphics processing output (e.g. draw call) are usually subjected to an initial so-called "vertex shading" operation, before the primitives are rasterised and rendered. This "vertex shading" operation operates to transform attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices (and otherwise) so as to generate a desired set of output vertex attributes (i.e. appropriately "shaded" attributes) for use in subsequent processing stages of the graphics processing pipeline.

The vertex shader execution typically produces (transformed) vertex positions and one or more outputs explicitly written by the vertex shader. Attributes communicated from the vertex shader to rasterisation and rendering other than position are usually referred to as "varyings". (Thus the non-position outputs from the vertex shader (and only the non-position outputs from the vertex shader) are "varyings".))

Once the vertex attributes have been shaded, the "shaded" attributes are then used when processing the vertices (and the primitives to which they relate) in the remainder of the graphics processing pipeline.

One form of graphics processing pipeline is a so called tile-based graphics processing pipeline, wherein the two-dimensional render output (target) is rendered as a plurality of smaller area sub-regions, usually referred to as "tiles". The tiles are each rendered separately (typically one after another). The rendered tiles are then combined to provide the complete rendering output (e.g. frame for display).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

In a tile-based rendering system, in order to be able to identify and know those primitives that are actually present in a given rendering tile (so as to, e.g., avoid unnecessarily rendering primitives that are not actually present in a tile), primitives to be processed for a given output (e.g. that make up the draw call currently being processed) are usually sorted into respective primitive lists that indicate for respective regions of the graphics processing output (render output), which primitives are to be processed for the region in question. The regions for which primitive lists are prepared in this regard may for example correspond to individual rendering tiles, or sets of plural rendering tiles. A given primitive may be included in more than one primitive list, e.g. where the primitive falls in more than one region.

Once the primitives of the set of primitives currently being processed (e.g. that make up the draw call currently being processed) have been sorted into respective primitive lists, the respective rendering tiles can then be processed (rasterised and rendered) independently of each other, using the primitive lists to identify those primitives that need to be processed for the tile in question.

FIG. 1 shows an exemplary tile-based graphics processing pipeline.

As shown in FIG. 1, a set of primitives 1 to be processed when generating a desired render output such as a frame (image) to be displayed will be stored as a set of input primitives in a memory 2 of or accessible to the graphics processor (graphics processing unit (GPU)) that is executing the graphics processing pipeline illustrated in FIG. 1.

Vertex shading to generate appropriate vertex shaded positions and other attributes for the input primitives to be processed for the render output will then be performed (step 3) to provide a set of primitives with vertex shaded positions and other attributes.

The vertex shaded primitives are then subjected to any desired primitive culling operations, such as back face culling and culling of primitives that are outside the viewport, etc. (step 4).

The primitives that pass the culling tests (so, for example, "on-screen" and front facing primitives) are then subject to a tiling process (step 5), in which the primitives are sorted into respective primitive lists to thereby indicate the primitives that need to be processed for each rendering tile of the render output being generated. The primitive lists, together with the appropriate primitive data, 6 are then stored in the memory 2.

Once all the primitives of the set of primitives being considered have been subjected to the tiling process, such that the primitive lists are complete, then the next stages of the graphics processing can be performed.

These stages are performed on a per-tile basis, and thus, as shown in FIG. 1, for each tile that is to be processed to generate the render output, the primitives to be processed for that tile (as determined from the primitive lists) are first subjected to rasterisation and depth testing (step 7), with any fragments that pass the depth test then being subjected to appropriate rendering (fragment shading) to generate rendered fragment data (step 8). (In the exemplary pipeline shown in FIG. 1 it is assumed that the rendering process will include fragment shading, but other arrangements would, of course, be possible.)

The rendered fragment data for the appropriate sampling positions that the rendered fragments correspond to is stored in a tile buffer 9, until the processing for the tile has been completed, at which point the tile buffer data (i.e. the finished, rendered tile (for the set of primitives being processed)) can then be written back to the memory 2. This is repeated for each tile making up the render output, until the memory 2 stores the entire render output (all the rendered tiles for the render output), at which point the render output in the memory can be used as desired, such as being provided to a display for display.

The Applicants believe there remains scope for improvements to graphics processing pipelines that employ vertex shading.

BRIEF DESCRIPTION OF THE DRAWINGS

A number of embodiments of the technology described herein will now be described by way of example only and with reference to the accompanying drawings, in which.

Like reference numerals are used for like components in the Figures.

DETAILED DESCRIPTION

Figure 1:
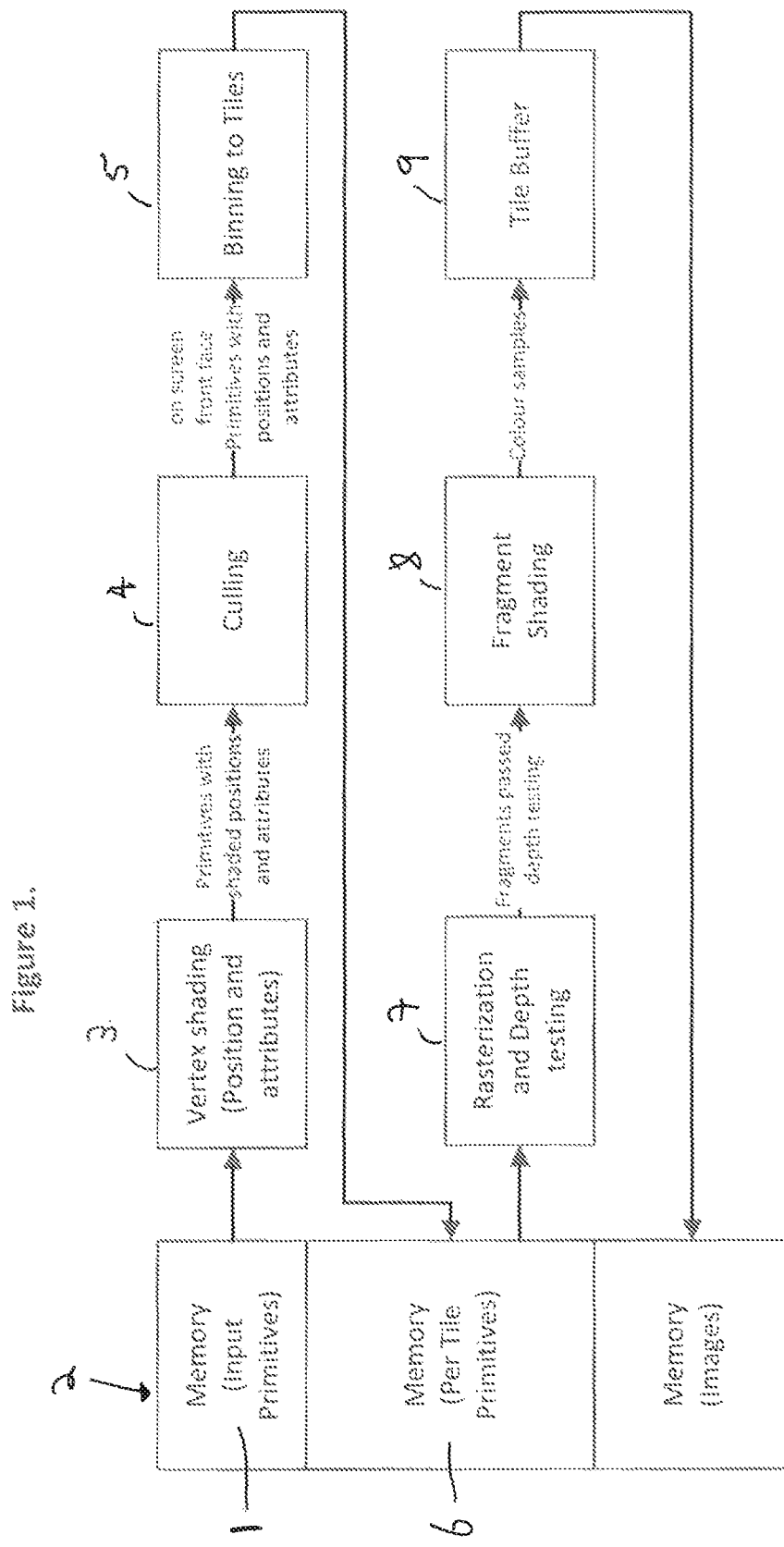
FIG. 1 shows an exemplary tile-based graphics processing pipeline.

A first embodiment of the technology described herein comprises a method of performing tile-based graphics processing, in which a render output to be generated is processed as a plurality of tiles for rendering purposes, the method comprising:

performing a first vertex shading operation on one or more vertices of a set of vertices for a set of primitives to be processed for generating a render output, each vertex having associated with it a plurality of vertex attributes, the first vertex shading operation generating vertex shaded attribute data for at least some but not all of the plurality of vertex attributes of the one or more vertices, and including at least generating vertex shaded position data for the one or more vertices; and using the vertex shaded position data generated by the first vertex shading operation to prepare primitive lists indicative of which primitives of the set of primitives should be rendered for respective rendering tiles that the render output being generated has been divided into for rendering purposes;

the method further comprising:

when processing primitives for a tile of the render output being generated:
rasterising primitives to be processed for the tile to generate corresponding fragments for rendering the primitives;
performing culling testing before rendering fragments; and
subjecting fragments generated by the rasteriser that pass the culling testing to rendering;

wherein the method further comprises:
performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser.

A second embodiment of the technology described herein comprises a graphics processor operable to perform tile-based graphics processing, in which a render output to be generated is processed as a plurality of tiles for rendering purposes, the graphics processor comprising:

a vertex shader circuit configured to perform a first vertex shading operation on one or more vertices of a set of vertices for a set of primitives to be processed for generating a render output, each vertex having associated with it a plurality of vertex attributes, the first vertex shading operation generating vertex shaded attribute data for at least some but not all of the plurality of vertex attributes of the one or more vertices, and including at least generating vertex shaded position data for the one or more vertices; and a tiling circuit configured to use the vertex shaded position data generated by the first vertex shading operation to prepare primitive lists indicative of which primitives of a set of primitives should be rendered for respective rendering tiles that a render output being generated has been divided into for rendering purposes;

a rasteriser circuit configured to rasterise primitives to be processed for a tile of a render output being generated to generate corresponding fragments for rendering the primitives;

a culling testing circuit configured to perform culling testing prior to rendering fragments generated by the rasteriser; and a rendering circuit configured to render fragments generated by the rasteriser that pass the culling testing;

wherein the graphics processor further comprises:
a control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser.

The technology described herein relates to tile-based graphic processing in which vertex shading is performed to generate vertex shaded attribute data for vertices to be processed for a render output.

However, in the technology described herein, unlike in conventional vertex shading arrangements, the vertex shading operation is divided into two parts, a first vertex shading operation that at least generates vertex shaded position data (but does not generate vertex shaded data for other vertex attributes), and a second vertex shading operation that generates vertex shaded data for vertex attributes that were not processed in the first vertex shading operation. Moreover, the second vertex shading operation is deferred until the rasterisation of primitives to fragments, and is controlled based on results of culling (e.g., and in an embodiment, depth) testing prior to rendering the fragments (and, as will be discussed further below, in embodiments at least, in such a way that the second vertex shading operation will, where possible, only be completed for vertices corresponding to fragments that pass the culling (e.g. depth) testing).

The Applicants have recognised that in many cases not all the vertices defined for, an, e.g. draw call, will in fact be used to generate the desired graphics output, e.g. frame for display. This may occur, e.g., when one or more vertices belong (solely) to primitives that will in fact not contribute to the desired graphics output. The Applicants have further recognised that any vertex shading computations performed for such "unused" vertices are ultimately redundant.

The technology described herein addresses this by providing a system that can avoid redundant vertex shading computations. This is achieved, as mentioned above, by splitting the vertex shading into two stages, and conditionally controlling the execution of the second stage for vertices that it is determined should be processed further (e.g. that are determined to be required to generate the graphics processing output). In this way, only a reduced set of vertex shading operations can be performed for vertices that it can be determined will in fact be "unused".

Furthermore, the technology described herein defers the second vertex shading operation until the rasterisation of primitives to fragments, and controls it based on the culling testing prior to rendering fragments generated by the rasteriser. This defers the second vertex shading operation in the sequence of operations for the graphics processing until closer to the point at which the vertex shaded attribute data generated by the second vertex shading operation will actually be needed, and correspondingly increases the opportunity for culling primitives (and thus vertices) that will not actually contribute or be needed for the render output being generated before the second vertex shading operation is performed (as it defers the second vertex shading operation until after, for example, any per-primitive culling operations (such as back face culling and screen space culling), and any early culling (e.g. depth) testing during or after rasterisation (and before rendering (fragment shading)), have been performed). This will increase the opportunity to identify and remove "unused" vertices before the second vertex shading operation is completed.

The technology described herein can thus provide a reduction in the amount of vertex shading computations performed by the graphics processing pipeline, thereby reducing memory bandwidth, computation load and power consumption (e.g. compared to arrangements in which all the vertices defined, e.g. for a draw call, are fully vertex shaded before any further graphics processing is performed).

The technology described herein relates to tile-based graphics processing i.e., in which the render output (such as, e.g., a frame to be displayed) is divided into plural rendering tiles for rendering purposes (is processed on a tile-by-tile basis). Each rendering tile should, and in an embodiment does, span a (respective) sub-region (area) of the render output. The tiles that the render output is divided into for rendering purposes in the technology described herein can be any suitable and desired such tiles. The size and shape of the rendering tiles may be dictated by the tile configuration that the graphics processor is configured to use and handle.

The rendering tiles are in an embodiment all the same size and shape (i.e. regularly sized and shaped tiles are in an embodiment used), although this is not essential. The tiles are in an embodiment rectangular, and in an embodiment square. The size and number of tiles can be selected as desired. Each tile may correspond to an array of contiguous sampling positions, for example each tile being 16×16 or 32×32 or 64×64 sampling positions in size. The render output may be divided into however many such tiles are required to span the render output, for the size and shape of the render output that is being used.

In the technology described herein, a first vertex shading operation is performed on one or more vertices of a set of vertices for a set of primitives to be processed for generating a render output.

The set of vertices that is being processed in this regard can be any desired and suitable set of vertices to be processed for the render output being generated. Thus the set of vertices may comprise (and in one embodiment does comprise) the entire set of vertices defined for a given graphics processing output (render target), such as for a frame to be displayed. It may also comprise a set of vertices that is defined for less than the entire render output, such as a set of vertices defined for a given draw call. In an embodiment, the set of vertices is a set of vertices defined for a draw call.

(Where the set of vertices is less than the entire set of vertices defined for a given render output, then in an embodiment the operation in the manner of the technology described herein is repeated for each set of vertices (e.g., and in an embodiment, each draw call) of the render output. Correspondingly, the process of the technology described herein is in an embodiment repeated for plural, and in an embodiment for each, render output to be generated, e.g. for successive frames in a sequence of output frames.)

Each vertex in the set of vertices will have associated with it a plurality of vertex attributes, including at least a position (attribute). In an embodiment each vertex has associated with it both a position, and one or more other, non-position attributes (varyings), such as colour(s), light, texture coordinates, normal, etc.

The first vertex shading operation that processes (vertex shades) one or more vertices of the set of vertices may process only some but not all of the vertices of the set of vertices, but in an embodiment processes all of the vertices of the set of vertices being processed (i.e. each vertex in the set of vertices being processed is subjected to the first vertex shading operation).

The first vertex shading operation performs vertex shading for at least one but not all of the vertex attributes of the vertices (i.e. for some but not all of the vertex attributes), and includes at least performing vertex shading of a position (attribute) of the vertices, so as to generate vertex shaded position data for the vertices that are subjected to the first vertex shading operation.

In an embodiment the first vertex shading operation transforms the vertex positions (e.g., and in an embodiment, an (X, Y, Z, W) position for a vertex), e.g., and in an embodiment, to corresponding "screen space" positions for the vertices.

In an embodiment, only the vertices' positions are processed in the first vertex shading operation (and thus in an embodiment no varyings are processed in the first vertex shading operation), but it would also be possible for the first vertex shading operation to process one or more other (non-position) attributes as well as position attributes, if desired.

Thus, the first vertex shading operation in an embodiment transforms at least, and in an embodiment only, the positions of the vertices being processed.

The first vertex shading operation is in an embodiment implemented using execution threads that execute a sequence of program instructions that perform the first vertex shading operation. Thus the first vertex shading operation is in an embodiment implemented by means of a processing core or cores (a shader core or cores) of the graphics processor that is executing the graphics processing pipeline executing an appropriate vertex shader (vertex shading program) for the vertices. Each vertex to be processed is in an embodiment represented as an execution thread, which threads execute the appropriate vertex shading program to carry out the vertex shading operation. In an embodiment there is one execution thread per vertex to be processed.

The vertex shaded attribute data that is generated by the first vertex shading operation should be, and is in an embodiment, stored appropriately for subsequent use for the graphics processing (by the graphics processing pipeline). The vertex shaded attribute data generated by the first vertex shading operation may be stored locally to the graphics processor (e.g. in a storage, such as a cache, that is on-chip with the graphics processor that is executing the graphics processing pipeline), and/or it may be written out to a (e.g. main) memory of the overall system that the graphics processor is part of, as desired, and, e.g., and in an embodiment, in dependence upon what the data will be used for in the future. It is in an embodiment stored in the normal manner for vertex shaded attributes in the graphics processor/graphics processing system in question.

Once the first vertex shading operation has been completed for the set of vertices in question, then the results of the first vertex shading operation can be, and are in an embodiment, used to perform processing of the set of primitives to be processed when generating the render output that use the vertices of the set of vertices. In the technology described herein, this comprises at least using the vertex shaded position data generated by the first vertex shading operation to prepare primitive lists indicative of which primitives of the set of primitives should be rendered for the respective rendering tiles that the render output being generated has been divided into for rendering purposes.

It will be appreciated in this regard that the set of primitives which are sorted into respective primitive lists using the vertex shaded position data for the vertices will correspond to the set of vertices that is being considered. Thus where the set of vertices that is being processed corresponds to the set of vertices for generating the entire (complete) render output, then the set of primitives which are processed and sorted into the primitive lists will correspondingly comprise the set of primitives for generating the entire (complete) render output. Correspondingly, where the set of vertices are a set of vertices for generating part of the render output (e.g. corresponding to a draw call), then the set of primitives that is being processed will correspondingly be the set of primitives for that part of the render output (e.g. for the draw call in question).

The primitive lists indicative of which primitives of the set of primitives should be rendered for respective rendering tiles of the render output being generated that are prepared should indicate for respective regions (areas) of the render output (area), primitives that need to be processed for that region. In effect, each region can be considered to have a bin (the primitive list) into which primitives that are found to (at least in part) fall within (i.e. intersect) the region can be placed (and, indeed, the process of sorting the primitives on a region-by-region basis in this manner may be referred to as "binning"). The graphics processor should, and in an embodiment does, comprise an appropriate tiler (tiling circuit/stage) that sorts the primitives into the respective primitive lists for this purpose.

In the technology described herein, one or more, and in an embodiment plural, primitive lists can be, and are in an embodiment, prepared (with each primitive list identifying (listing) any primitives which are to be processed for the respective region (area) of the render output in question).

The regions for which primitive lists are prepared in an embodiment encompass (or correspond to) one or more rendering tiles of the render output. For example, primitive lists corresponding to individual rendering tiles may be prepared, and/or primitive lists corresponding to sets of plural rendering tiles may be prepared. In an embodiment a region for which a primitive list is prepared corresponds to one or more contiguous tiles (and thus spans an array of contiguous sampling positions). The regions for which primitive lists are prepared are in an embodiment rectangular (and more in an embodiment square).

In an embodiment, there are one or more sets of regions for which primitive lists can be prepared, with the regions in different sets of regions in an embodiment differing in size (area). In this case, the sets of regions are in an embodiment arranged in a hierarchy of sets of regions, wherein each set of regions corresponds to a layer in the hierarchy of sets of regions, and wherein regions for which primitive lists are prepared in progressively higher layers of the hierarchy are progressively larger.

In an embodiment, each region for which a primitive list can be prepared in a lowest layer of the hierarchy corresponds to a single tile of the render output, with regions in successively higher layers encompassing progressively more tiles, e.g. corresponding to 2×2 tiles, 4×4 tiles, 8×8 tiles, etc. respectively (or any other suitable and desired increasing region size).

In order to prepare the primitive lists, the primitives of the set of primitives may be, and are in an embodiment, first assembled, with the positions of the assembled primitives then being used to determine which region(s) of the render output the primitives fall within (and thus which primitive list(s) to include the primitives in).

Assembling the set of primitives may be performed by a suitable primitive assembly circuit. Thus there may be, and is in an embodiment, a primitive assembly circuit/stage (process) prior to the tiling (primitive list preparing) circuit/stage.

Assembling the set of primitives may be performed in any suitable and desired manner. For example, primitive assembly may comprise receiving information (e.g. indices) identifying vertices of the set of vertices to be used to form the primitives of the set of primitives, and then assembling primitives (determining the vertices corresponding to each primitive of the set of primitives) using the information (e.g. indices) identifying the vertices. The primitive assembly may be performed in accordance with information (primitive configuration information) indicating how the primitives are to be assembled, e.g. indicating whether primitives in the form of simple triangles, triangle strips, or triangle fans, etc., should be generated from the set of vertices.

To prepare the primitive lists, the (assembled) primitives should be, and are in an embodiment, sorted (binned) into one or more primitive lists based on the region(s) of the render output which the primitives fall within.

Which region(s) a primitive falls within (and accordingly which primitive lists a primitive could be included in) should be, and is in an embodiment, determined based on the position of the primitive in the render output, and in particular based on the vertex shaded positions of the vertices of the primitive generated by the first vertex shading operation.

The determination of which region(s) a primitive falls within may use any suitable and desired technique, such as exact binning, or bounding box binning, or a combination of these techniques. In an embodiment bounding box binning is used when preparing the primitive lists.

Including (listing) a primitive in a primitive list (bin) may, and in an embodiment does, comprise listing appropriate data for the primitive in the primitive list, such as an identifier (e.g. an index) for the primitive, together with an indication of the vertices of the primitive (e.g. such as an index identifying each vertex of the primitive).

The primitive lists which are prepared may be, and are in an embodiment, stored in a suitable storage (e.g. memory, e.g. a local memory, or in an embodiment a main memory of the graphics processing system which the graphics processor is part of), for later use.

It would be possible, if desired, to perform one or more "per-primitive" based culling tests, e.g., and in an embodiment, prior to preparing the primitive lists, so as to, for example, eliminate from further processing (and avoid including in the primitive lists) any primitives that it can already be determined will not contribute to the render output being generated.

These per-primitive culling tests prior to the preparation of the primitive lists can comprise any suitable and desired form of per-primitive culling tests, such as, and in an embodiment, one or more, or both of: a primitive facing direction culling test (e.g., and in an embodiment, a back facing primitive culling test, to cull any back facing primitives); and a view-frustum-based culling test (e.g., and in an embodiment, to cull any primitives that fall outside the view frustum). Other per-primitive culling tests could also or instead be used if desired.

Thus in an embodiment, only front facing primitives that fall at least partly within the view frustum are considered when preparing the primitive lists.

These per-primitive culling tests can be carried out in any suitable and desired manner, and may, and in an embodiment do, use at least the appropriate vertex shaded position data for the vertices of the primitives generated by the first vertex shading operation.

This will help to ensure that any primitives that it can be determined at an early stage will not contribute to the render output being generated are not included in the primitive lists (and thus will not be processed when processing the individual rendering tiles).

The vertex shaded attribute data, including at least the vertex shaded position data, generated by the first vertex shading operation may be stored and retained for use after it has been used to prepare the primitive lists (for use after the primitive lists have been prepared), for example, and in an embodiment, for use also when processing the individual rendering tiles. Thus in one embodiment, at least some of, and in an embodiment all of, the vertex shaded attribute data, including at least the vertex shaded position data, generated by the first vertex shading operation is stored and retained for use after the primitive lists have been prepared, e.g., and in an embodiment, so as to be available for, and to be used when, subsequently processing the individual rendering tiles.

However, it is not necessary to retain the vertex shaded attribute data generated by the first vertex shading operation beyond the preparation of the primitive lists, and so in another embodiment, the vertex shaded attribute data, including the vertex shaded position data, generated by the first vertex shading operation is not retained after the preparation of the primitive lists (is discarded after the preparation of the primitive lists) (once it has been used for preparing the primitive list(s)).

As will be discussed further below, this may then require (re) generating some or all of the vertex shaded attributes data, including the vertex shaded position data, that was generated in the first vertex shading operation for vertices when processing the individual rendering tiles, but the Applicants have recognised that it may still be less burdensome to do that, rather than storing the vertex shaded attribute data generated by the first vertex shading operation for later use when processing the individual rendering tiles. For example, a memory bandwidth saving associated with discarding the vertex shaded position attributes for a primitive may outweigh a potential arithmetic cost associated with processing (shading) position attributes for the primitive a second time during subsequent processing on a per-tile basis.

It would also be possible to handle any state associated with and generated for the primitives in a similar manner, if desired, for example, and in an embodiment, either to store such state for use in subsequent processing of a primitive, or to discard some or all of the state for a primitive (to not store some or all of the state for the primitive for use in subsequent processing of the primitive), and correspondingly then re-generate the state as required during subsequent processing of the primitive.

In an embodiment, the operation is configured to either always retain for later use any (or particular) vertex shaded attribute data generated by the first vertex shading operation, or to always discard all (or particular) vertex shaded data generated by the first vertex shading operation after the primitive lists have been prepared (such that that data may then need to be (re) generated when subsequently processing the individual rendering tiles). This may be permanently configured, or, for example, set dynamically, e.g. by a driver for the graphics processor, e.g. on an application-by-application or render output-by-render output basis. In one embodiment, any vertex shaded attributes data, including the vertex shaded position data, generated by the first vertex shading operation is discarded (is not retained) after the primitive lists have been prepared.

It would also be possible if desired, to determine whether to retain or discard vertex shaded attributes data generated by the first vertex shading operation on a more dynamic, e.g. primitive-by-primitive basis. This may be based, for example, on an appropriate property or properties of the primitives, such as the size of the primitive. In this case, as well as determining whether or not to retain the vertex shaded attribute data generated by the first vertex shading operation for primitives, an appropriate indication is in an embodiment also provided (e.g. as metadata) (and stored) to indicate for respective primitives or groups of primitives whether the vertex shaded attribute data from the first vertex shading operation has been retained (is present in memory for use) or not. This will then allow subsequent processing to determine whether the vertex shaded attribute data is already available in memory or not.

(Any (or particular) state associated with and generated for the primitives is in an embodiment handled in the same manner as for the vertex shaded attribute data.)

Once the primitive lists have been prepared, then the individual rendering tiles for the render output can be processed, using the primitive lists to determine which primitives of the set of primitives should be processed for each respective rendering tile. Thus, when processing a tile, in an embodiment a primitive list or lists relevant to the tile to be processed (the relevant primitive list(s) each corresponding to a region of the render output which includes (some or all of) the tile) are identified, and the identified primitive list(s) then used when processing the tile to identify the primitives to be processed for the tile (e.g. by reading the primitive identifiers and corresponding vertex identifiers from the primitive list(s)). The graphics processor in an embodiment includes an appropriate primitive list reader (primitive list reading circuit) for this purpose.

The rendering tiles should be, and are in an embodiment, processed on a tile-by-tile basis, with each tile (corresponding to respective sub-region (area) of the render output) being processed separately (e.g. in turn).

The processing performed for a (and each) tile of the render output being generated comprises at least rasterising primitives to be processed for the tile to generate corresponding fragments for rendering the primitives, subjecting the fragments generated by the rasteriser to a depth test before rendering the fragments, and then rendering fragments generated by the rasteriser that pass the depth test.

The rasteriser/rasterisation process should, and in an embodiment does, rasterise primitives to be processed for a tile to graphics fragments, and provide the graphics fragments to subsequent graphics processing stages of the graphics processing pipeline for processing.

Thus the rasteriser will, and in an embodiment does, receive primitives to be processed for the tile in question, e.g., and in an embodiment, from a primitive providing stage (circuit) (primitive list reader), rasterise those primitives to fragments, and provide the fragments to subsequent fragment processing stages (circuits) for processing.

To do this, the rasteriser/rasterisation process should, and in an embodiment does, determine which sampling positions of an array of sampling positions covering the tile in question are covered by a primitive (determine the sampling positions that should be used for the primitive (i.e. the (x, y) positions) of the sampling positions to be used to represent the primitive) in the tile in question), and generate corresponding graphics fragments for rendering.

In order to do this, the rasteriser will use the positions of the primitives to determine which sampling positions within the tile being generated are covered by the primitive. This should be, and is in an embodiment, done using the vertex shaded (transformed) positions for the vertices of the primitives.

Each fragment generated by the rasteriser may represent (have associated with it) a single sampling position, or plural sampling positions, as desired. In an embodiment, each fragment represents a set of plural, and in an embodiment four (2×2), sampling positions.

The rasteriser (rasterisation process) can rasterise primitives to be processed for a tile to fragments in any suitable and desired manner.

In an embodiment, the rasterisation (rasterisation process) is configured to perform "hierarchical rasterisation". Thus, the rasteriser is in an embodiment operable to test primitives to be rasterised against progressively smaller patches (regions) of the render output area, e.g., and in an embodiment, in an iterative manner. Other arrangements for the rasteriser or rasterisation process would be possible. For example, in other embodiments, the rasteriser rasterises primitives to fragments in a non-hierarchical manner.

There may be one or more other processing stages/circuits before the rasteriser, such as for any other suitable and desired process that may be performed on a tile-by-tile basis prior to rasterisation. Such prior to rasterisation stages/circuits in an embodiment comprise one or more of, and in an embodiment plural of, and in an embodiment all of: a vertex loading stage (circuit) (a vertex loader); a polygon (triangle) setup stage (circuit); and a rasteriser (e.g. reorder) buffer (that is operable to, and configured to, buffer, and in an embodiment also reorder, primitives for providing to the rasteriser).

As discussed above, the rasterisation process will use the positions of the primitives to be rendered, and thus accordingly (and in an embodiment) the appropriately transformed (vertex shaded) positions of the vertices for the primitives that are being rasterised.

In the case where the vertex shaded position data from the first vertex shaded operation is retained (stored) for future use after the preparation of the primitive lists, then the appropriate vertex shaded position data for the vertices of the primitives being rasterised that was prepared as part of the first vertex shading operation, can be, and is in an embodiment, simply reused (e.g. from where it is stored in memory) for the rasterisation process. Thus in one embodiment, the rasterisation process uses the vertex shaded position data generated by the first vertex shading operation.

In the alternative case where the vertex shaded position data from the first vertex shading operation is not retained for use after the preparation of the primitive lists, then that vertex shaded position data for the vertices of primitives to be rasterised will need to be, and is in an embodiment, (re) generated for the vertices for the primitives to be rasterised, before the primitives are subjected to the rasterisation process.

In another embodiment therefore, the method of the technology described herein comprises (and the graphics processor is correspondingly configured to) performing, prior to rasterisation, another vertex shading operation (that is after and distinct from the first vertex shading operation) (and, in an embodiment, also distinct from and before the second vertex shading operation) for vertices of primitives to be rasterised for a tile being rendered. In this case, the another vertex shading operation in an embodiment operates to vertex shade only the positions for the vertices (i.e. generates vertex shaded position data for the vertices), which vertex shaded position data is then used by the rasteriser (for the rasterisation process).

The another vertex shading operation to generate the vertex shaded position data for vertices for primitives to be rasterised for a tile may be configured and performed in any suitable and desired manner, but in an embodiment corresponds to (and is) a repetition of the first vertex shading operation (in particular where the first vertex shading operation generates vertex shaded position data only). Thus, in this case, in an embodiment, when rendering a tile, the first vertex shading operation will, in effect, be performed again, in order to generate the vertex shaded position data for use by the rasteriser/rasterisation process (but only for vertices of primitives to be rasterised).

In this case, the another vertex shading operation to generate the vertex shaded position data for the rasteriser/rasterisation process is in an embodiment performed on a tile-by-tile basis and as a rendering tile is being generated, but before the rasterisation process (and thus after the preparation of the primitive lists and, for example, after triangle (polygon) setup has been performed for a rendering tile).

In the case where all of the vertex shaded position data generated by the first vertex shading operation is discarded after the preparation of the primitive lists, then this another vertex shading operation to generate the vertex shaded position data for use by the rasteriser/rasterisation process can simply be performed (and triggered) for each (different) vertex that is required for a primitive to be processed for the rendering tile in question.

On the other hand, where the decision as to whether to retain or discard the vertex shaded position data from the first vertex shading operation is made more dynamically, e.g. on a primitive-by-primitive basis, then in an embodiment, the generating of vertex shaded position data for a vertex and primitive prior to rasterisation is in an embodiment controlled and triggered on the basis of an appropriate indication of whether that data has been retained from the first vertex shading operation for the vertex and/or primitive in question or not (with the vertex shading position data then being (re)generated where required prior to rasterisation, but otherwise being used from memory (for example)).

Thus in a such embodiment, it is checked whether the vertex shaded position data from the first vertex shading operation for a given vertex or primitive is already stored in the memory (in an embodiment by checking a suitable indication, e.g. associated with (provided in) the primitive lists, as discussed above), with the vertex shaded position data for a vertex and/or primitive then being (re)generated or not, accordingly.

In the case where the vertex shaded position data for vertices is generated by another vertex shading operation prior to rasterisation, then the another vertex shading operation to generate the vertex shaded position data for vertices and primitives to be rasterised for a tile can be controlled and triggered in any suitable and desired manner. In an embodiment, the another vertex shading operation is triggered by issuing an appropriate request (command) to perform the another vertex shading operation for a vertex or vertices.

Such requests (commands) may be sent for individual vertices, or groups of plural vertices at a time, as desired, and can be sent by any suitable and desired stage/circuit of the graphics processor/graphics processing pipeline. For example, the primitive list reader (circuit) may issue requests (commands) to perform the another vertex shading operation for vertices of primitives as it reads the primitives (and their vertices) from the primitive list(s) applying to a tile.

Correspondingly a request (command) for the another vertex shading operation can take any suitable and desired form. In an embodiment, it comprises information needed by the graphics processor/processing pipeline to be able to carry out the another vertex shading operation. In an embodiment the request includes information (an indicator) that identifies it as being a request to trigger the another vertex shading operation, and/or an identifier that identifies the request, and/or information that identifies the vertex or vertices to which the request relates.

In the case where vertex shaded positions for vertices for primitives to be rasterised for a tile are generated using another vertex shading operation (i.e. as and when a tile and the primitives for that tile fall to be processed), then while the vertex shaded position data generated by the another vertex shading operation could be stored out to (main) memory, in an embodiment the vertex shaded position data generated by the another vertex shading operation is stored in an intermediate, in an embodiment local, and in an embodiment on-chip, storage, of and for the graphics processor, such as, and in an embodiment, a cache of (or available to) the graphics processor (without being written to main memory). This information is thus in an embodiment retained locally to the graphics processor while processing the tile in question, but not otherwise written out to (e.g. main) memory (where possible).

Where another vertex shading operation is being performed to generate vertex shaded position data for vertices of primitives prior to rasterisation, then in an embodiment, the graphics processor and graphics processing pipeline is configured to keep track of (and the method correspondingly comprises keeping track of) vertices and/or groups of vertices that have been subjected to the another vertex shading operation and for which the vertex shaded (position) data from the another vertex shading operation is already available for use (i.e. for which vertex shaded position data has been generated (and is (still) stored)). This will help to avoid unnecessarily repeating the another vertex shading operation for vertices that have already been used for primitives in the tile in question (and for which the vertex shaded position data is still available for use) (the Applicants have recognised in this regard that primitives may share vertices, and so where a vertex is shared, the vertex shaded position data for that vertex is preferentially only generated once (where possible)).

Such tracking of vertices and/or groups of vertices that have been subjected to the another vertex shading operation may be achieved in any suitable and desired manner. For example, information indicating vertices and/or groups of vertices for which the another vertex shading operation has been performed (and the results still stored) can be maintained and stored, with this information then being used to determine whether a vertex (or group of vertices) that it has been determined should (potentially) be subjected to the another vertex shading operation actually needs to be subjected to the another vertex shading operation or not (with the another vertex shading operation then being performed or not for the vertex (or group of vertices) accordingly).

For example, the vertex shaded position data for vertices generated by the another vertex shading operation could be stored in a (position) cache, with it then being checked for a vertex whether there is already vertex shaded position data (an entry) in the cache for the vertex before triggering the another vertex shading operation for the vertex.

The another vertex shading operation is again in an embodiment implemented using execution threads that execute a sequence of program instructions that perform the another vertex shading operation. Thus the another vertex shading operation is in an embodiment implemented by means of a processing core or cores (a shader core or cores) of the graphics processor that is executing the graphics processing pipeline executing an appropriate vertex shader (vertex shading program) for the vertices. Each vertex to be processed is in an embodiment represented as an execution thread, which threads execute the appropriate vertex shading program to carry out the vertex shading operation. In an embodiment there is one execution thread per vertex to be processed.

Although, as discussed above, it is preferred for the another vertex shading operation to generate vertex shaded position data only, and to be separate to, and distinct from, the second vertex shading operation that generates other (non-position) vertex shaded attribute data for vertices, it would be possible, if desired, to also include (trigger) the second vertex shading operation that generates vertex shaded attributes data for non-position attributes (for example) for vertices at the time when the another vertex shading operation is triggered, but to, for example, delay or defer the non-position attribute vertex shading (that will be performed as the second vertex shading operation) such that it should not complete until after the appropriate ("early") culling testing has been carried out (so that that vertex shading can be controlled based on the results of the early culling testing in the manner of the technology described herein).

Once the vertex shaded position data is available for the vertices of a primitive (whether by being generated using the another vertex shading operation or by being retrieved from memory), then the primitive can be rasterised.

Thus a primitive is in an embodiment not sent for rasterising until the vertex shaded position data for all the vertices of the primitive is available (e.g. until that vertex shaded position data has been generated by the another vertex shading operation for all of the vertices of the primitive in question). There is accordingly, in an embodiment, an appropriate primitive "latency" buffer, where primitives can be buffered (retained) prior to sending for rasterising while any necessary vertex shaded position data is made available (e.g. while any necessary another vertex shading operation for vertices for primitives to be rasterised is completed).

It is accordingly in this regard in an embodiment tracked whether the vertex shaded position data for all the vertices of primitives is available, with the primitives then being sent onwards for rasterising accordingly.

In the technology described herein, "early" culling testing is carried out before graphics fragments are rendered, e.g., and in an embodiment, to try to identify fragments, and/or sampling positions associated with fragments, that do not in fact need processing, before the fragments are issued to the rendering process (pipeline). This will help to avoid sending fragments and/or sampling positions that will not in fact contribute to the render output through the rendering pipeline.

This "early" culling testing that is carried out before graphics fragments are rendered can comprise any suitable and desired such "early" culling testing that can be performed in graphics processing and in a graphics processing pipeline. In an embodiment, the "early" culling testing comprises early depth testing. In another embodiment, it comprises early stencil testing, and in another embodiment it comprises both early depth testing and early stencil testing. Any other form of early culling testing that could be carried out before graphics fragments are rendered could also or instead be performed, if desired.

The early culling testing can be carried out in any suitable and desired manner, e.g., and in an embodiment, in the normal/existing manner for such testing used in the graphics processor and graphics processing system/pipeline in question.

As discussed above, in an embodiment, the early culling testing that is carried out before graphics fragments are rendered comprises early depth testing, e.g., and in an embodiment, to try to identify fragments, and/or sampling positions associated with fragments, that will be occluded by earlier primitives (in the primitive processing order for the tile in question) (and therefore that do not need processing), before the (later) fragments are issued to the rendering process (pipeline). This will help to avoid sending fragments and/or sampling positions that are occluded, e.g. by already processed earlier primitives, through the rendering pipeline.

Thus in an embodiment, the method of the technology described herein comprises performing depth testing before rendering fragments;
   subjecting fragments generated by the rasteriser that pass the depth testing to rendering; and
   performing a second vertex shading operation for vertices and primitives for which fragments have been generated by the rasteriser prior to rendering graphics fragments, to generate vertex shaded attribute data for at least one of the vertex attribute of the plurality of vertex attributes of the vertices for which vertex attribute data was not generated in the first vertex shading operation, based on the results of the depth testing before rendering fragments generated by the rasteriser.

Correspondingly, the graphics processor in an embodiment comprises a depth testing circuit configured to perform depth testing prior to rendering fragments generated by the rasteriser, and the control circuit is in an embodiment configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the depth testing before rendering fragments generated by the rasteriser.

The early depth testing can be carried out in any suitable and desired manner, e.g., and in an embodiment, in the normal/existing manner for such testing used in the graphics processor and graphics processing system/pipeline in question.

The early depth testing may comprise a single depth test or a combination (set) of plural depth tests (e.g., and in an embodiment, at different resolutions of the render output).

The early depth testing may be implemented, e.g., as part of the rasteriser, or after the rasteriser (but before the renderer), or as a combination of this (e.g. where there is more than one early depth test). In an embodiment it is implemented as part of the rasterisation process and/or after the rasteriser but before the rest of the graphics processing pipeline.

The early depth testing in an embodiment compares a depth value or values, e.g. for a new fragment and/or sampling position to be processed, to a current depth value for that fragment position and/or sampling position (e.g. stored in a depth buffer), to see if the new fragment and/or sampling position is occluded or not.

In one embodiment, the "early" depth testing operates on fragments as a whole. Thus, the graphics processor and graphics processing pipeline in an embodiment includes an early depth tester that tests individual fragments.

In this case, the test is in an embodiment carried out only for fragments that are fully (completely) covered by the primitive in question, and in an embodiment uses a depth value range or a single depth value for the fragment as a whole.

In an embodiment, the "early" depth testing also or instead operates on (tests), single sampling positions and/or sets of sampling positions that contain fewer sampling positions than the sets of sampling positions that a given fragment is associated with (such as for two of the four sampling positions that a fragment is associated with). This may be as well as or instead of a depth test that tests fragments as a whole. In this case, the early depth test in an embodiment operates on single (covered) sampling positions. In this case each sampling position in an embodiment has an associated depth value, i.e., there is in an embodiment a depth value for each sampling position (which may be shared with other sampling positions), that is used for the depth test.

In an embodiment, the early depth testing is operable in respect of (tests) both single sampling positions, and whole fragments. This may be at different depth test points in the pipeline processing sequence.

In an embodiment, there is also an early depth test that tests sets of plural fragments (which is in an embodiment then followed by an early fragment depth test or tests that test individual fragments and/or sampling positions (and in respect of all of which depth tests operate in the manner of the technology described herein can be, and is, in an embodiment controlled)).

In the case where there is an early depth test that tests sets of plural fragments, that early depth test in an embodiment operates on patches (sets) of plural fragments. For example, where the rasteriser can rasterise primitives into patches of plural fragments, such patches could then be subjected as a whole to an early depth test. Thus, in an embodiment, there is an early depth test that operates on patches (sets) of plural fragments. In this case, that early depth test will accordingly relate to a set of plural fragments (i.e. the patch of fragments being considered).

This test is in an embodiment carried out only for patches (sets) of plural fragments that are fully (completely) covered by the primitive in question, and in an embodiment uses a range of depth values for the patch (set) of plural fragments.

In the case where the early culling testing also or instead comprises testing other than early depth testing, such as early stencil testing, then that early culling testing (e.g. stencil testing) can correspondingly be carried out in the same or similar manner to the early depth testing as discussed above. For example, appropriately combined depth and stencil testing may be performed in the above manner.

The early culling, e.g. depth, testing that is performed prior to rendering should be, and is in an embodiment, used to, where appropriate, cull fragments and/or sampling positions associated with fragments, prior to rendering (e.g., and in an embodiment, in the normal manner for the graphics processor and graphics processing pipeline in question).

Thus, if a sampling position or positions, or fragment or fragments, being tested fails an early culling, e.g. depth, test (e.g. is found to be occluded), then that sampling position or positions, or fragment or fragments, is in an embodiment "culled" from further processing in the pipeline.

This culling can be achieved (and provided) in any desired and suitable manner. For example, where the culling (e.g. depth) test is in respect of a whole fragment (or set of plural whole fragments), then in an embodiment the fragment or set of plural fragments is not sent onwards through the pipeline for processing (e.g. for rendering) (i.e. they are "culled").

On the other hand, if the culling (e.g. depth) test is in respect of fewer than all of the sampling positions associated with a fragment to be rendered, then in an embodiment further processing of the sampling position(s) in question (i.e., that failed the culling, e.g. depth, test) is prevented (stopped), e.g., by marking the sampling positions as "disabled" (e.g. by indicating them to not be covered in a coverage mask associated with the fragment in question), or in any other suitable manner (but the fragment in question is still sent onwards (through the pipeline) so that the "non-culled" sampling positions associated with the fragment will still be processed).

Correspondingly, if a fragment or at least one sampling position associated with a fragment passes the early culling (e.g. depth) test(s), then the fragment or the fragment that the sampling position is associated with is sent onwards for processing (towards the renderer).

In the technology described herein, a second vertex shading operation may be performed for vertices of primitives for which fragments have been generated by the rasteriser prior to rendering the graphics fragments. This second vertex shading operation is performed and controlled based on the results of the (early) culling testing prior to rendering fragments. The way that the second vertex shading operation is controlled in this regard will be discussed in more detail below.

The second vertex shading operation that is performed prior to rendering graphics fragments, and that is controlled based on the results of the depth testing prior to rendering fragments, operates to vertex shade at least one other attribute that was not vertex shaded in the first vertex shading operation (for any vertex that is subjected to the second vertex shading operation).

The second vertex shading operation in an embodiment vertex shades any remaining attributes of the vertices in question that will be required for subsequent processing of the graphics fragments after the rasterisation and early depth testing (and for which vertex shaded attributes data is not already available).

Thus the second vertex shading operation in an embodiment vertex shades any and all attributes of the vertices in question that will be required for processing the graphics fragments and for which vertex shaded attribute data is not already available.

The second vertex shading operation thus in an embodiment operates to vertex shade one or more non-position attributes for the vertices (i.e. one or more attributes which are not position attributes), and in an embodiment one or more, and in an embodiment plural, and in an embodiment all, of, the (required) varyings (i.e. non-position attributes) for the vertices, such as one or more of, and in an embodiment all of: colour, lights, texture coordinates, normals, diffuse, specular, etc., or anything else needed to enable the final output to be generated.

In an embodiment, the second vertex shading operation vertex shades all the remaining attributes of the vertices in question (that were not vertex shaded in the first vertex shading operation).

The second vertex shading operation may also vertex shade an attribute or attributes that were processed by the first vertex shading operation and/or by the another vertex shading operation (where present), but that is not preferred, at least in the case where such vertex shaded attributes data is not required for processing the graphics fragments, and/or is already available (e.g. stored locally or in memory) for processing the graphics fragments, e.g. because it has been retained from the first vertex shading operation or the another vertex shading operation, as appropriate.

Thus in an embodiment, the second vertex shading operation does not vertex shade position attributes (generate vertex shaded position data) for the vertices that has already been generated and retained from the first or another vertex shading operation, as appropriate, with any required vertex shaded position data for processing the graphics fragments then being provided from the first vertex shading operation or the another vertex shading operation as appropriate (rather than being generated by the second vertex shading operation).

This said, if desired, the second vertex shading operation could be used to (re) generate vertex shaded attributes data that is already available and/or that was previously generated by the first vertex shading operation or the another vertex shading operation, if desired.

The second vertex shading operation can be triggered for a vertex in any suitable and desired manner. In an embodiment, the second vertex shading operation is triggered by issuing an appropriate request (command) to perform the second vertex shading operation for a vertex or vertices. Such requests (commands) may be sent for individual vertices, or for groups of plural vertices at a time, as desired, and can be sent by any suitable and desired stage/circuit of the graphics processor/graphics processing pipeline. For example, a vertex cache, the primitive list reader, the rasteriser, and/or early depth tester (e.g. all via a vertex cache), may be able to issue, and issue, a request (command) to perform the second vertex shading operation, if desired and as appropriate.

Correspondingly a request (command) for the second vertex shading operation can take any suitable and desired form. In an embodiment, it comprises information needed by the graphics processor/processing pipeline to be able to carry out the second vertex shading operation. In an embodiment the request includes information (an indicator) that identifies it as being a request to trigger the second vertex shading operation, and/or an identifier that identifies the request, and/or information that identifies the vertex or vertices to which the request relates.

The vertex shaded attributes data generated by the second vertex shading operation could be stored out to (main) memory. However, in an embodiment the vertex shaded attributes data generated by the second vertex shading operation is stored in an intermediate, in an embodiment local, and in an embodiment on-chip, storage, of and for the graphics processor, such as, and in an embodiment, a cache of (or available to) the graphics processor (without being written to main memory). This information is thus in an embodiment retained locally to the graphics processor while processing the tile in question, but not otherwise written out to (e.g. main) memory (where possible).

In an embodiment, the graphics processor and graphics processing pipeline is configured to keep track of (and the method correspondingly comprises keeping track of) vertices and/or groups of vertices that have been subjected to the second vertex shading operation (i.e. for which vertex shaded attributes data has been generated by the second vertex shading operation and for which the vertex shaded attributes data from the second vertex shading operation is already available for use (i.e. for which vertex attributes data has been generated by the second vertex shading operation (and is (still) stored))). This will help to avoid unnecessarily repeating the second vertex shading operation for vertices that have already been vertex shaded for fragments being rendered in the tile in question (and for which the vertex shaded attributes data is still available for use).

Such tracking of vertices and/or groups of vertices that have been subjected to the second vertex shading operation may be achieved in any suitable and desired manner. For example, information indicating vertices and/or groups of vertices for which the second vertex shading operation has been requested/performed (and the results still stored) can be maintained and stored, with this information then being used to determine whether a vertex (or group of vertices) that it has been determined should (potentially) be subjected to the second vertex shading operation actually needs to be subjected to the second vertex shading operation or not (with the second vertex shading operation then being performed or not for the vertex (or group of vertices) accordingly).

For example, vertices for which the second vertex shading operation has been requested could be stored in a (vertex) cache, with it then being checked for a vertex whether there is already an entry in the cache for the vertex before triggering the second vertex shading operation for the vertex (e.g., and in an embodiment, such that if there is a cache "miss", the second vertex shading operation is requested for a vertex).

The second vertex shading operation is again in an embodiment implemented using execution threads that execute a sequence of program instructions that perform the second vertex shading operation. Thus the second vertex shading operation is in an embodiment implemented by means of a processing core or cores (a shader core or cores) of the graphics processor that is executing the graphics processing pipeline executing an appropriate vertex shader (vertex shading program) for the vertices. Each vertex to be processed is in an embodiment represented as an execution thread, which threads execute the appropriate vertex shading program to carry out the vertex shading operation. In an embodiment there is one execution thread per vertex to be processed.

In the technology described herein the performing of the second vertex shading operation prior to rendering fragments is performed (is controlled) based on the results of the early culling (e.g. depth) testing before rendering.

The performing of the second vertex shading operation for vertices of primitives for which fragments have been generated by the rasteriser prior to rendering the graphics fragments can be performed and controlled based on the results of the culling testing before rendering fragments in any suitable and desired manner. In an embodiment, this is done in such a way that, and such that, the second vertex shading operation can be, and is in an embodiment, not completed (is avoided being completed) for (at least some) vertices that will not in fact be required for rendering fragments of primitives (i.e. which do not belong to any primitives for which at least one fragment will be rendered).

Thus, in an embodiment, the results of the culling (e.g. depth) testing before rendering fragments is used to control whether the second vertex shading operation is completed for vertices. This may be achieved as desired. In an embodiment, the results of the culling (e.g. depth) testing before rendering fragments is used to control whether the second vertex shading operation is started for a vertex and/or to determine whether to stop a second vertex shading operation that is being performed for a vertex.

Thus, in an embodiment, the (control of the) performing of a second vertex shading operation for vertices of primitives for which fragments have been generated by the rasteriser prior to rendering the graphics fragments based on the results of the culling (e.g. depth) testing before rendering comprises (at least) one of: starting the second vertex shading operation for a vertex (and vertices) based on the results of the culling testing before rendering fragments generated by the rasteriser; and stopping a second vertex shading operation that is being performed for a vertex (and vertices) based on the results of the culling testing before rendering fragments generated by the rasteriser.

In one particularly embodiment, the results of the culling (e.g. depth) testing before rendering fragments is used to determine whether to trigger (to start) the second vertex shading operation for a vertex (and to trigger (to start) the second vertex shading operation for a vertex). Thus, in an embodiment, performing (controlling) the second vertex shading operation for vertices of primitives for which fragments have been generated by the rasteriser based on the results of the culling (e.g. depth) testing before rendering fragments comprises determining whether to perform (to trigger/start) the second vertex shading operation for a vertex based on the results of the culling (e.g. depth) testing before rendering. In this case therefore, the second vertex shading operation for a vertex will be started (triggered) or not on the basis of the results of the culling (e.g. depth) testing before rendering.

In this case therefore, the second vertex shading operation for vertices will only be triggered (started) once the rasterisation and culling testing prior to rendering have been completed. Thus, in one embodiment, the second vertex shading operation is triggered (started) for vertices after the rasterisation and the culling testing prior to rendering (and based on the culling testing prior to rendering).

This operation can be achieved in any suitable and desired manner. In an embodiment, the second vertex shading operation is triggered (is started) for vertices associated with primitives corresponding to fragments that pass the early culling (e.g. depth) testing, and in an embodiment in response to fragments passing (surviving) the culling testing prior to rendering (and therefore falling to be rendered).

Thus, in a particular such embodiment, the second vertex shading operation is triggered (started) based on, and in response to, fragments passing (that pass) the culling (e.g. depth) testing before rendering.

Thus in this case, when a fragment generated by the rasteriser has passed (all of) the early culling testing (such that the fragment will be rendered), in an embodiment the second vertex shading operation is triggered (started) for vertices associated with the fragment (if it has not already been started for any of the vertices in question).

Correspondingly, in an embodiment, the second vertex shading operation is only started for vertices associated with primitives for which at least one fragment passes (and has passed) the early culling (e.g. depth) testing before rendering. Similarly, the second vertex shading operation is in an embodiment only started for a vertex once (and after) a fragment for a primitive that uses the vertex has passed the early culling (e.g. depth) testing before rendering.

As discussed above, in this embodiment, those vertices and/or groups of vertices for which the second vertex shading operation has been started in this arrangement are in an embodiment tracked, so as to try to avoid unnecessarily repeating the second vertex shading operation for vertices for which that operation has already been started (e.g. because a previous fragment from a primitive using the vertex has already passed the early culling testing and therefore triggered the second vertex shading operation for the vertex or group of vertices in question). As discussed above, this is in an embodiment done by storing vertices for which the second vertex shading operation has been started in a (vertex) cache, with the cache operation then triggering the starting of the second vertex shading operation for a vertex in the case where there is not already an entry for the vertex in the cache (i.e. there is a cache miss).

Thus, in an embodiment of this arrangement of the technology described herein, an indication of the vertices for primitives for which at least one fragment has survived the early culling testing (e.g. in the form of an indication of primitives that have survived the early culling testing) is provided to a vertex tracking arrangement, such as a vertex cache, with that vertex tracking arrangement (e.g. cache) then triggering (starting) the second vertex shading operation for any new vertices that it receives and for which the second vertex shading operation has not already been triggered.

Other arrangements would, of course, be possible.

In another embodiment, rather than using the results of the culling (e.g. depth) testing before rendering to control whether the second vertex shading operation is triggered (started) for vertices, the results of the culling testing before rendering fragments is used to (try to) stop the second vertex shading operation being continued (being completed) for vertices.

Thus, in another embodiment, the performing and controlling of the second vertex shading operation for vertices of primitives for which fragments have been generated by the rasteriser based on the results of the culling (e.g. depth) testing before rendering comprises stopping (attempting to stop) the second vertex shading operation for vertices based on the results of the depth testing before rendering (using the results of the culling (e.g. depth) testing before rendering to determine whether to stop the second vertex shading operation for vertices).

In this case, the second vertex shading operation may be, and is in an embodiment, started for vertices before it is known whether any fragments using the vertices have passed the early culling testing prior to rendering, with the results of the early culling testing prior to rendering then being used to (attempt to) stop the (already started) performing of the second vertex shading operation for vertices (where that can be determined from the results of the early culling testing before rendering fragments).

In these embodiments, the second vertex shading operation is in an embodiment triggered (started) for vertices for primitives, and in an embodiment for all primitives, that are sent for rasterisation (e.g., and in an embodiment, as they are read from the primitive list(s) applying to a tile), in an embodiment such that the second vertex shading operation is triggered for vertices of primitives that are to be rasterised prior to rasterisation of the primitives being started.

The so-started second vertex shading operations are in an embodiment then (attempted to be) stopped, where appropriate, based on the results of the early culling testing before rendering.

Thus, in this case, the second vertex shading operation will be started for vertices before it is known whether any fragments for the primitives in question will in fact be passed for rendering.

The early culling (e.g. depth) testing before rendering is then, and in an embodiment, used to, where appropriate, attempt to stop the already started second vertex shading operations for vertices, for example, and in an embodiment, in the case where it can be determined as a result of the early culling (e.g. depth) testing before rendering that no fragments for a primitive that uses a vertex will in fact be sent for rendering.

In these embodiments, the results of the early culling testing before rendering are in an embodiment used to determine whether a primitive being rasterised has been entirely culled (discarded) as a result of the early culling testing before rendering (i.e. such that no fragments for the primitive will fall to be rendered), with the second vertex shading operation then being (attempted to be) stopped for the vertices of a primitives that are determined to be completely culled as a result of the early culling testing before rendering.

Thus, in an embodiment, the early dulling testing tracks and is configured to track whether primitives are entirely culled as a result of that early culling testing before rendering, and in response to it being determined that a primitive has been entirely culled by the early culling testing before rendering, triggers the stopping of (the sending of a request to stop) the second vertex shading operation for the vertices of the primitive.

The stopping of (an already started) second vertex shading operation in these arrangements based on the results of the culling testing before rendering can be achieved in any suitable and desired manner. In an embodiment an appropriate "stop" ("kill") request is sent to (try to) stop the second vertex shading operation for the vertex or vertices in question.

Thus, in an embodiment, the method of technology described herein comprises, when processing primitives for a tile of the render output being generated:
  requesting the second vertex shading operation for vertices of primitives to be processed for the tile prior to rasterising the primitives;
  rasterising primitives to be processed for the tile to generate corresponding fragments for rendering the primitives;
  performing culling (e.g. depth) testing before rendering the fragments and based on the results of the culling testing before rendering fragments, determining whether the second vertex shading operation for any vertex for which the second vertex shading operation has been requested should be stopped, and in response to determining that the second vertex shading operation for a vertex should be stopped, sending a request that the second vertex shading operation for the vertex be stopped.

Correspondingly, the graphics processor of the technology described herein in an embodiment comprises:
  a second vertex shading operation requesting circuit configured to request the second vertex shading operation for vertices of primitives to be processed for a tile prior to rasterising the primitives; and
  the control circuit configured to control the performing of a second vertex shading operation based on the results of the culling testing before rendering fragments generated by the rasteriser is configured to:
    determine, based on the results of the culling testing before rendering fragments, whether the second vertex shading operation for any vertex for which the second vertex shading operation has been requested should be stopped, and in response to determining that the second vertex shading operation for a vertex should be stopped, send a request that the second vertex shading operation for the vertex be stopped.

As discussed above, in an embodiment determining whether the second vertex shading operation for any vertex for which the second vertex shading operation has been requested should be stopped based on the results of the culling testing before rendering fragments comprises determining that the second vertex shading operation for a vertex should be stopped in response to a primitive that uses the vertex being (completely) culled as a result of the early culling testing before rendering (such that no fragment for the primitive will be sent for rendering for the tile).

In this embodiment, where a request to stop the second vertex shading operation for a vertex is sent, then in response to that request, where the second vertex shading operation for the vertex has still to be completed, the second vertex shading operation will be, and is in an embodiment, stopped before it is completed (e.g., and in an embodiment, by terminating the execution thread that is performing the second vertex shading operation for the vertex in question).

(It will be appreciated here that in some cases the second vertex shading operation may be completed for a vertex before the "stop" request is sent/received. In that case the second vertex shading operation will have already been completed for the vertex in question. However, the Applicants expect that there will be at least some vertices for which the second vertex shading operation can be stopped before it has been completed, thereby avoiding some or all of the processing required for those second vertex shading operations.)

Correspondingly, the (already started) second vertex shading operation is in an embodiment continued (and completed) for vertices associated with primitives for which at least one fragment passes the early culling testing before rendering.

As discussed above, in this embodiment, those vertices and/or groups of vertices for which the second vertex shading operation has been started in this arrangement are in an embodiment tracked, so as to try to avoid unnecessarily repeating the second vertex shading operation for vertices for which that operation has already been started (e.g. because a previous primitive using the vertex has already triggered the second vertex shading operation for the vertex or group of vertices in question). As discussed above, this is in an embodiment done by storing vertices for which the second vertex shading operation has been started in a (vertex) cache, with the cache operation then triggering the starting of the second vertex shading operation for a vertex in the case where there is not already an entry for the vertex in the cache (i.e. there is a cache miss).

Thus, in an embodiment of this arrangement of the technology described herein, an indication of the vertices for primitives that have been sent for rasterisation (e.g. in the form of an indication of primitives that have been sent for rasterisation) is provided to a vertex tracking arrangement, such as a vertex cache, with that vertex tracking arrangement (e.g. cache) then triggering (starting) the second vertex shading operation for any new vertices that it receives and for which the second vertex shading operation has not already been triggered.

Correspondingly, in an embodiment, the (potential) stopping of the second vertex shading operation for vertices, e.g. when a primitive is culled, is also controlled via and by the second vertex shading operation vertex tracking arrangement, such as and in an embodiment, a vertex cache (as discussed above), with the vertex tracking arrangement (e.g. cache) sending requests to stop the second vertex shading operation for a vertex (where it is appropriate to that).

Thus, in this case, the rasterisation and culling testing prior to rendering in an embodiment provides an indication of vertices for which the second vertex shading operation should be stopped, in an embodiment in the form of an indication of primitives that have been entirely culled as a result of the culling testing prior to rendering, to the vertex tracking arrangement, e.g. vertex cache, with that vertex tracking arrangement (e.g. cache) then sending a request to stop the second vertex shading operation for a vertex or vertices (where a request to stop the second vertex shading operation for the vertex or vertices has not already been sent).

Other arrangements would, of course, be possible.

Fragments generated by the rasteriser that pass the early culling testing should be, and are in an embodiment, sent to the renderer (the rendering pipeline) for rendering, to generate rendered fragment data for the fragment in question. The rendering process should, and in an embodiment does, use at least some of the vertex shaded attribute data generated by the second vertex shading operation, and so any fragments that are to be sent onwards for rendering should, and in an embodiment do, use the results of the second vertex shading operation for the vertices of the primitives to which the fragments relate.

Thus a fragment is in an embodiment not sent onwards for rendering until the second vertex shading operation has been completed for all of the vertices of the primitive to which the fragment relates. There is accordingly, in an embodiment, an appropriate fragment "latency" buffer, where fragments can be buffered (retained) prior to sending for rendering while any necessary second vertex shading operations for vertices for primitives to which the fragments relate are completed.

It is accordingly in this regard in an embodiment tracked whether the vertex shaded attributes data from the second vertex shading operation is available for the vertices of primitives, with fragments for the primitives then being sent onwards for rendering accordingly.

Once all the necessary second vertex shading operation vertex shaded attributes data is available for a fragment to be rendered, then the fragment can be rendered (sent to the rendering pipeline for rendering).

The renderer (rendering circuit) and rendering process should be, and is in an embodiment, operable to, and configured to, render (shade) graphics fragments it receives to generate the desired output rendered fragment data. The rendering itself can be performed in any suitable and desired manner, and may contain any suitable and desired rendering elements/processor.

Thus, for example, the renderer/rendering process may comprise a fixed function rendering pipeline, including one or more fixed function rendering stages, such as texture mappers, blenders, fogging units, etc. In an embodiment the renderer/rendering process comprises a fragment shader (a shader pipeline) (i.e. a programmable pipeline stage that is operable to and can be programmed to carry out fragment shading programs on fragments in order to render them). The renderer/rendering process may also or instead include (performing) ray-tracing, if desired.

The output rendered fragment data is in an embodiment stored in a tile buffer (as the graphics processing is tile-based), from where it can be, and is in an embodiment, then written out to an output buffer, such as a frame buffer, in external memory, for use (e.g. to display a frame on a display).

Where desired, the graphics processor and graphics processing pipeline may include any other desired element/circuit/stages, e.g. following the renderer and before the tile buffer, such as one or more (late) depth testers (depth test stages), a blender (blending stage), etc.

The writing out of the rendered fragment data from the tile buffer to the output buffer may also comprise, for example, downsampling and/or compressing the data from the tile buffer as it is written out.

Thus, the graphics processor in an embodiment also comprises a tile buffer for storing rendered fragment data values and/or a write out unit that operates to write the data in the tile buffer (e.g. once the data in the tile buffer is complete) out to external (main) memory (e.g. to a frame buffer).

Other arrangements for the graphics processor and the graphics processing pipeline that is being executed would, of course, be possible.

The above describes the elements of the graphics processor and graphics processing pipeline that are involved in the operation in the manner of the technology described herein. As will be appreciated by those skilled in the art, the graphics processor and processing pipeline can otherwise include, and in an embodiment does include, and execute, any one or one or more, and in an embodiment all, of the other processing circuits/stages that graphics processors and graphics processing pipelines may (normally) include.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The render output to be generated may comprise any render output that can be and is to be generated by a graphics processor and processing pipeline, such as a frame for display, a render-to-texture output, etc. In an embodiment, the render output is an output frame, and in an embodiment an image.

In an embodiment, the various functions of the technology described herein are carried out on a single graphics processing platform that generates and outputs the (rendered) data that is, e.g., written to a frame buffer for a display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

A number of embodiments of the technology described herein will now be described.

As discussed above, the technology described herein relates to tile-based graphics processing pipelines in which vertex shading is performed to derive vertex shaded attributes for vertices of primitives to be processed when generating a render output, for example of the general form shown in FIG. 1.

However, in the technology described herein and the present embodiments, rather than performing all the vertex shading before the preparation of the primitive lists as in the graphics processing pipeline illustrated in FIG. 1, at least some of the vertex shading, and in particular in the present embodiments, the vertex shading for non-position attributes of vertices, is deferred until the rasterisation and depth testing that is performed when rendering individual rendering tiles.

Figure 2:
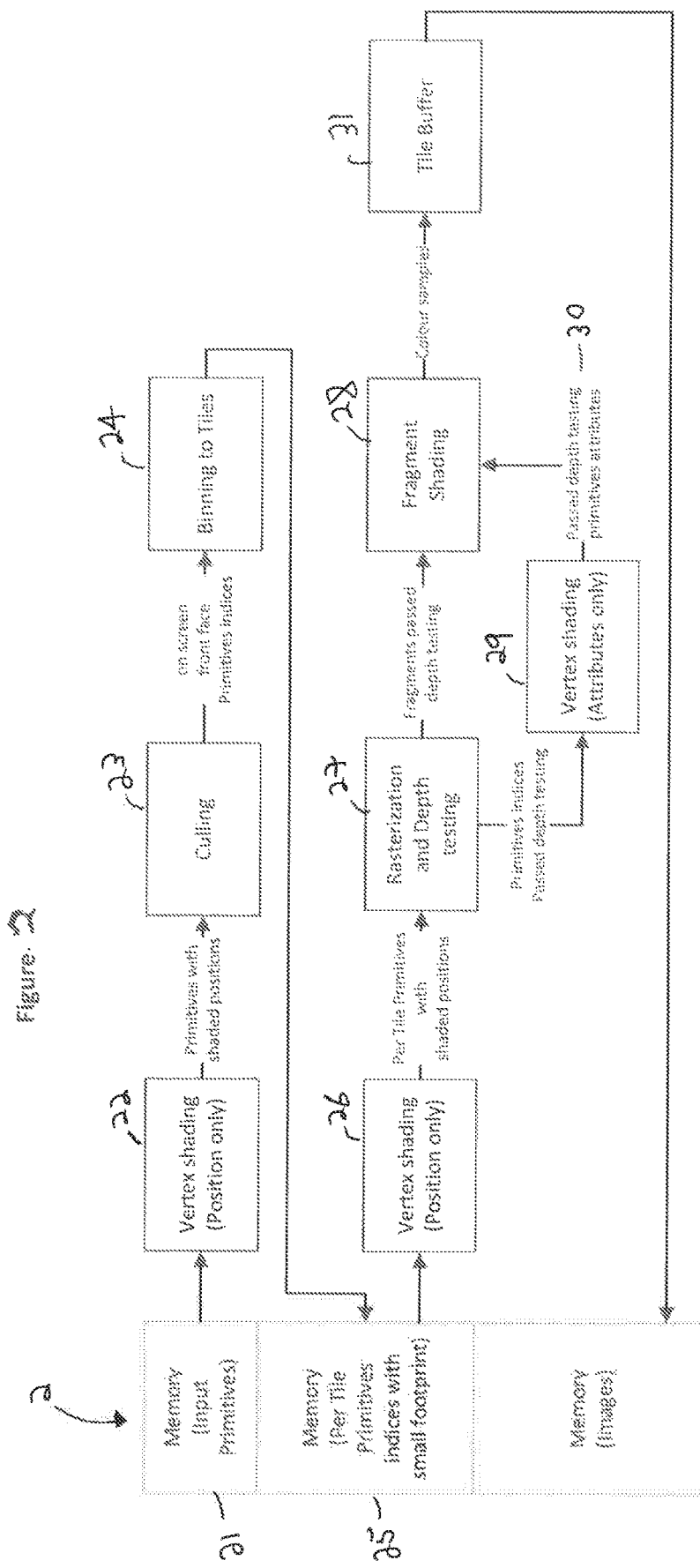
FIG. 2 shows schematically a graphics processing pipeline in an embodiment of the technology described herein.

FIG. 2 illustrates this, and shows the sequence of graphics processing in an embodiment of the technology described herein. As can be seen in FIG. 2, a number of the stages of the graphics processing in this embodiment correspond to stages of the graphics processing shown in FIG. 1, but there are also some differences.

Thus as shown in FIG. 2, in this embodiment, again a set of primitives 21 to be processed when generating a desired render output such as a frame (image) to be displayed is stored as a set of input primitives in memory 2.

A first vertex shading operation to generate vertex shaded data for the input primitives to be processed is then performed (step 22). However, as shown in FIG. 2, in this case, the first vertex shading operation is performed for the position attributes only, to thereby provide a set of primitives with vertex shaded positions (only).

The vertex shaded primitives are then subjected to any desired primitive culling operations, such as back face culling and culling of primitives that are outside the viewport, etc. (step 23).

The primitives that pass the culling tests are then subjected to a tiling process (step 24), in which the primitives are sorted into respective primitive lists to thereby indicate the primitives that need to be processed for each rendering tile of the render output being generated. The primitive lists 25, including the appropriate primitive data (which in this case will simply comprise the indices of the vertices for the primitives together with appropriate primitive identifiers), are then stored in the memory 2.

Once all the primitives of the set of primitives being considered have been subjected to the tiling process, then per-tile processing of the graphics processing when generating the render output can be performed.

Again, these stages are performed on a per-tile basis, for each tile that is to be processed generate the render output.

However, in this case, and as shown in FIG. 2, when processing a tile, the primitives to be processed for the tile (as determined from the primitive lists) are first subjected to another vertex shading operation (step 26), which generates the vertex shaded positions (only) for the vertices of the primitives that are included in the primitive lists and so are to be processed for the tile in question.

It should be noted here that in the embodiment as illustrated in FIG. 2, it is assumed that the vertex shaded positions generated for generating the primitive lists (in step 22) are discarded once they have been used to generate the primitive lists, so that the vertex shaded positions for the primitives in a tile (and in the tiles) need to be (re) generated for the rasterisation and rendering processes in step 26 as illustrated in FIG. 2.

It would alternatively be possible, instead of discarding the vertex shaded positions used when preparing the primitive lists (as generated in step 22 in FIG. 2), to retain the vertex shaded position data from the first vertex shading operation (in step 22) in memory, and then retrieve the relevant vertex shaded positions from the memory 2, rather than performing further vertex shading to generate the vertex shaded positions, when processing a tile. In this case, step 26 would comprise loading the vertex shaded positions from the memory 2 for the primitives that are to be processed for the tile in question.

As shown in FIG. 2, once the vertex shaded positions for primitives for a tile are available (whether having been (re) generated in step 26 or fetched from memory in step 26), then the primitives for the tile, together with their shaded positions, are provided to a rasterisation and depth testing stage (process) (step 27). The rasterisation and depth testing rasterises the primitives to graphics fragments for rendering, and performs one or more depth tests to determine whether any fragments can be discarded because they are occluded by other primitives for the tile.

Any fragments generated by the rasteriser that pass the depth testing are then subjected to appropriate rendering (fragment shading) to generate rendered fragment data (step 28), as shown in FIG. 2.

However, as shown in FIG. 2, as well as passing any fragments that pass depth testing for rendering (fragment shading), in the present embodiment vertex shading of the non-position attributes (such as colour, normal, lights, texture) for the vertices of primitives for which at least one fragment passes the depth testing (and thus proceeds to rendering (fragment shading)) is also triggered and performed (step 29).

Thus, as shown in FIG. 2, the indices of vertices for primitives for which at least one fragment has passed the depth testing are also passed to a (second) vertex shading operation (stage) 29, which performs non-position-attribute vertex shading for those vertices, to thereby provide the vertex shaded non-position attributes 30 for the vertices that will be required for the rendering (fragment shading) 28.

In this way, vertex shading of non-position attributes is performed for any vertices required for fragments that will be rendered, but can be avoided (not performed) for vertices that do not in fact belong to a primitive that needs to be rendered.

Once the appropriate vertex shaded non-position attributes have been generated, then the relevant fragments can be rendered using those vertex shaded non-position attributes, with the rendered fragment data then being stored in the tile buffer 31 and (eventually) written out therefrom to the memory 2.

Again, this will be repeated for each tile making up the render output, until the memory 2 stores the entire render output, at which point the render output in the memory can be used as desired.

FIG. 2 illustrates the main principle of the present embodiments, of deferring the non-position attributes vertex shading until rasterisation and early culling testing (in the form of depth testing) is being performed for a tile.

Figure 3:
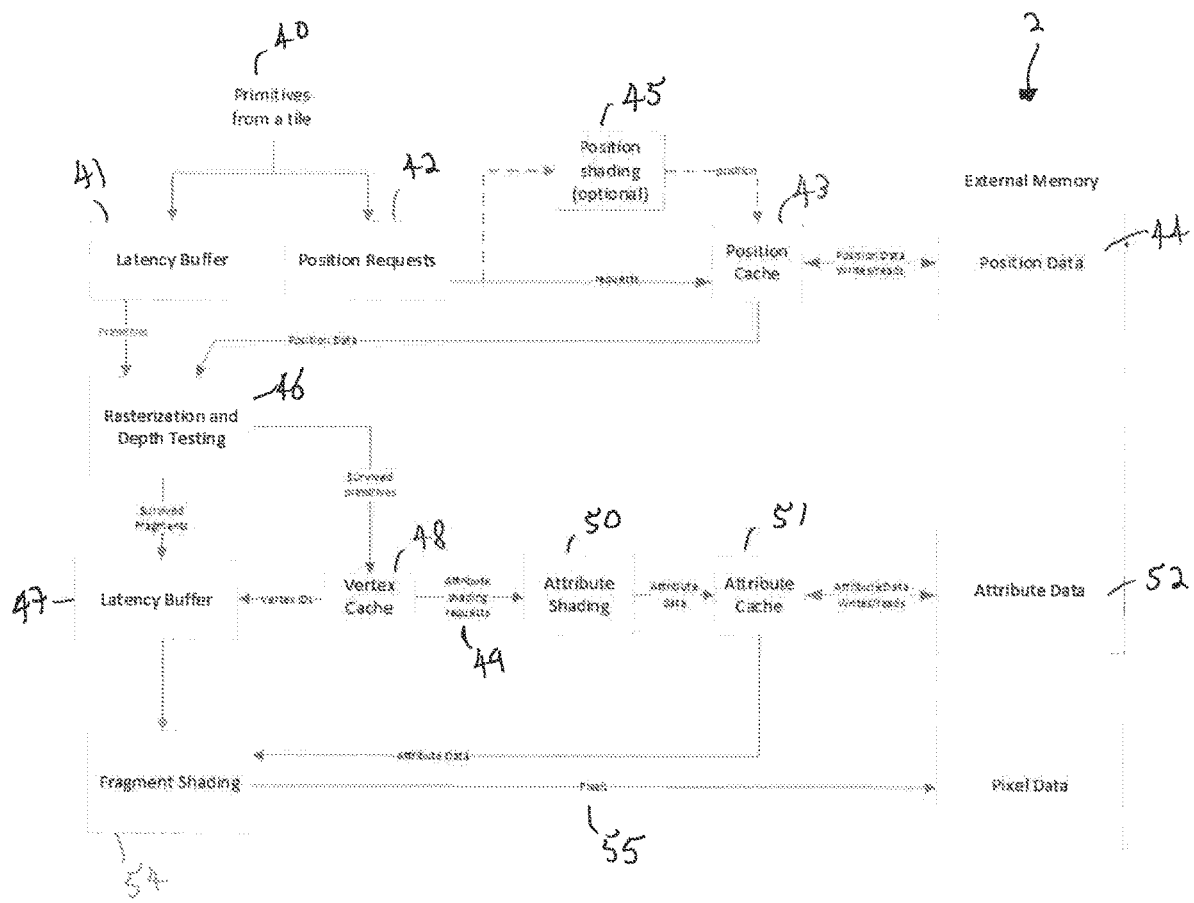
FIG. 3 shows an embodiment of the technology described herein.
Figure 4:
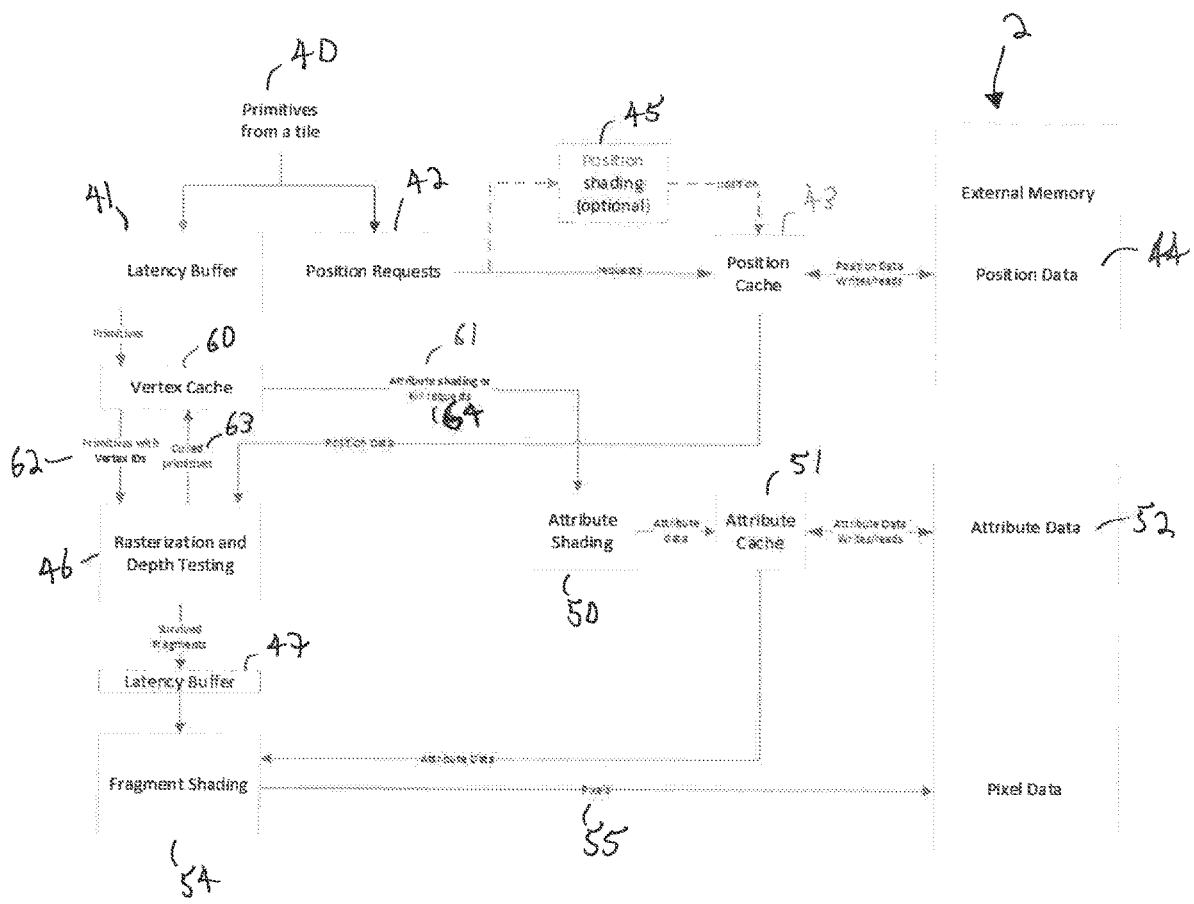
FIG. 4 shows another embodiment of the technology described herein.

FIGS. 3 and 4 show in more detail two alternative embodiments of this operation.

FIG. 3 shows an embodiment in which the non-position attributes vertex shading is only triggered once it is determined that a fragment for a primitive to which a vertex relates has definitely passed the early culling, depth testing (i.e. will definitely be sent for rendering (fragment shading)).

FIG. 4 shows an embodiment in which the non-position attributes vertex shading is started before it is definitely known that a vertex will be required for a fragment that is to be rendered, but with the facility to stop ("kill") non-position attribute vertex shading that has been started for a vertex if and when it is determined that the vertex will not in fact be required for a fragment to be rendered.

Both FIGS. 3 and 4 show the per-tile operation in the embodiments that they illustrate.

Starting with FIG. 3, primitives 40 to be processed for the tile in question are added to a latency buffer 41, and at the same time, the position data of the vertices for the primitives to be processed for the tile is requested 42.

(Latency buffer 41 is used to "hide" any latency while the vertex shaded position data is generated/fetched (to hide any position shading latency and/or the memory access latency when fetching the shaded vertex positions for the primitives to be processed). In the present embodiment, the latency buffer 41 is configured as a queue to which the primitives are added, with a primitive in the latency buffer then being marked as valid once the required vertex shaded position data is available for all the vertices of the primitive. Primitives are only allowed to exit the buffer once their "valid flag" is set (thereby indicating that all the vertex shaded position data for the vertices of the primitive is available). If the primitive at the head of queue is not flagged as "valid", then that primitive will be stalled until it is "valid" for processing. Other arrangements for the latency buffer 41 would, of course, be possible.)

As shown in FIG. 3, the position requests 42 are made to a position cache 43 that stores vertex shaded positions for vertices.

As discussed above, and as shown in FIG. 3, in the present embodiments, the vertex shaded position data for vertices can be loaded into the position cache 43 either by reading that data 44 from the memory 2 (e.g. if it has been retained from the earlier position shading performed when preparing the primitive lists), or by requesting and performing position shading 45 to generate the vertex shaded positions for storing in the position cache 43 "on the fly", as the request for the position data is made.

The position request 42 that is sent to the position cache 43 will identify the vertex that it relates to. If the vertex shaded position is already present in the position cache (there is a cache hit), then that can be noted and nothing further needs to be done. On the other hand, if the vertex shaded position data for the vertex in question is not already present in the position cache 43 (there is a cache miss), then that data needs to be loaded into the position cache 43 (either from memory 2, or as a result of a position shading operation 45, as appropriate).

Once the position data for the vertices for a primitive is available in the position cache 43 (whether it has been loaded from the external memory 2 or generated by performing position shading 45), then the primitive can be passed to rasterisation and depth testing 46 from the latency buffer 41 (thus primitives are passed to rasterisation and depth testing once the relevant vertex shaded position data for the vertices of the primitive is available in the position cache 43).

Rasterisation and depth testing 46 is then performed, with any fragments that survive (pass) the depth testing being sent to a fragment latency buffer 47 for buffering while the relevant non-position vertex shaded attributes data that will be needed by the fragments is generated.

In the present embodiment, the fragment latency buffer 47 is configured as a queue to which the fragments are added, with a fragment in the latency buffer then being marked as valid once the required vertex shaded position data is available for all the vertices of the primitive to which the fragment relates. Fragments are only allowed to exit the buffer once their "valid flag" is set (thereby indicating that all the vertex shaded position data for the vertices for the fragment is available). If the fragment at the head of queue is not flagged as "valid", then that fragment will be stalled until it is "valid" for processing. Other arrangements for the latency buffer 47 would, of course, be possible.

Additionally, any primitives that survive the depth testing (i.e. for which at least one fragment has been passed to the fragment latency buffer 47) are indicated to a vertex cache 48.

The vertex cache 48 maintains respective entries for vertices of primitives it receives (using respective vertex IDs for the vertices) and checks for duplication of vertices across primitives that it receives (i.e. whether there is a cache "hit" or not when a new primitive is received). The vertex cache 48 sends appropriate (non-position) attribute shading requests 49 for any new (unique) vertices (i.e. for which a non-position attribute shading request has not already been made (for which there is a cache "miss")) that it receives, for non-position attribute vertex shading 50 to be performed for those vertices.

The (non-position) attribute vertex shading 50 performs vertex shading (only) for non-position vertex attributes that will be required for the rendering (fragment shading) and any subsequent processing of the fragments. Thus it performs vertex shading for one or more non-position attributes, such as colour, lighting, texture coordinates, normal, etc., but not for any position attributes for which vertex shading has already been performed.

The vertex shaded non-position data for the vertices generated by the non-position attribute vertex shading 50 is then stored in a (non-position) attribute cache 51 using, in the present embodiment, the vertex ID as a pointer for storing the results from the attribute shading 50 in the attribute cache 51.

As shown in FIG. 3, it would also be possible to store non-position vertex shaded attribute data 52 in the external memory 2 (and correspondingly to retrieve that data from external memory into the attribute cache 51), if desired (for example where the attribute cache 51 is of a limited size, such that it may be desirable to evict previously generated attribute data for vertices from the attribute cache 51, but to have that data still available for future use). Other arrangements would, of course, be possible.

As shown in FIG. 3, the vertex cache 48 also sends the vertex IDs 53 for vertices for which (non-position) attribute vertex shading is being performed to the latency buffer 47 as part of the fragment data.

Once the non-position vertex shaded attribute data is available in the attribute cache 51, then the corresponding fragments can be and are issued from the latency buffer 47 for rendering (fragment shading) 54. This will use the vertex IDs associated with the fragments to identify and retrieve the appropriate vertex shaded attribute data from the attribute cache 51.

The resulting rendered fragment positions/pixels 55 are then written out to the memory 2 (e.g. via a tile buffer), e.g. in the normal manner.

This arrangement reduces the amount of non-position attribute vertex shading that is performed, since it only requests non-position attribute vertex shading for vertices for primitives that have survived the (early) depth testing. However, it may correspondingly require relatively larger latency buffers to avoid the corresponding increased process starting latency (while waiting for the relevant vertex shaded data to become available) from having too much impact on overall performance.

FIG. 4 shows an embodiment in which the non-position attributes vertex shading is started before it is definitely known that a vertex will be required for a fragment that is to be rendered, but with the facility to stop ("kill") non-position attribute vertex shading that has been started for a vertex when it is determined that the vertex will not in fact be required for a fragment to be rendered.

This embodiment will accordingly require less latency "hiding" than the embodiment shown in FIG. 3, but may result in the non-position attribute shading being done for vertices that are in fact not required for actually rendering any fragments.

As shown in FIG. 4, again primitives 40 to be processed for the tile in question are added to a latency buffer 41, and at the same time, position requests 42 are made to a position cache 43 that stores vertex shaded positions for vertices.

Again, as shown in FIG. 4, in the present embodiment, the vertex shaded position data for vertices can be loaded into the position cache 43 either by reading that data 44 from the memory 2 (e.g. if it has been retained from the earlier position shading performed when preparing the primitive lists), or by requesting and performing position shading 45 to generate the vertex shaded positions for storing in the position cache 43 "on the fly", as the request for the position data is made.

As before, the position request 42 that is sent to the position cache 43 identifies the vertex that it relates to, and if the vertex shaded position is already present in the position cache, then that can be noted and nothing further is done, but if the vertex shaded position data for the vertex in question is not already present in the position cache 43, then that data is loaded into the position cache 43 (either from memory 2, or as a result of a position shading operation 45, as appropriate).

Again, once the position data for the vertices for a primitive is available in the position cache 43 (whether it has been loaded from the external memory 2 or generated by performing position shading 45), then the primitive is passed for rasterisation and depth testing 46 from the latency buffer 41.

However, in this embodiment, and as shown in FIG. 4, any primitives that are being passed for rasterisation and depth testing are (first) indicated to a vertex cache 60 (which again maintains respective entries for vertices of primitives it receives (using respective vertex IDs for the vertices) and checks for duplication of vertices across primitives that it receives (i.e. whether there is a cache "hit" or not when a new primitive is received)).

The vertex cache 60 sends appropriate (non-position) attribute shading requests 61 for any new (unique) vertices (i.e. for which a non-position attribute shading request has not already been made (for which there is a cache "miss"))

that it receives, for non-position attribute vertex shading 50 to be performed for those vertices.

(It will be appreciated therefore, that in this embodiment, the non-position attribute shading is requested (and begun) for vertices before it is know whether those vertices will definitely be needed for fragments to be rendered.)

The (non-position) attribute vertex shading 50 again performs vertex shading (only) for non-position vertex attributes that will be required for the rendering (fragment shading) and any subsequent processing of the fragments.

The vertex shaded non-position data for the vertices generated by the non-position attribute vertex shading 50 is again stored in a (non-position) attribute cache 51, using the vertex ID as a pointer for storing the results from the attribute shading 50 in the attribute cache 51.

As discussed above, it would again be possible to store non-position vertex shaded attribute data 52 in the external memory 2 (and correspondingly to retrieve that data from external memory into the attribute cache 51), if desired.

As shown in FIG. 4, the vertex cache 60 also sends 62 the primitives together with vertex IDs of vertices of the primitives to rasterisation and depth testing 46.

Rasterisation and depth testing 46 is then performed, with any fragments that survive (pass) the depth testing being sent to a fragment latency buffer 47 for buffering while the relevant non-position vertex shaded attributes data that will be needed by the fragments is generated.

Again, once the non-position vertex shaded attribute data is available in the attribute cache 51, then the corresponding fragments can be and are issued from the latency buffer 47 for rendering (fragment shading) 54. This will again use the vertex IDs associated with the fragments to identify and retrieve the appropriate vertex shaded attribute data from the attribute cache 51.

The resulting rendered fragment positions/pixels 55 are then written out to the memory 2 (e.g. via a tile buffer), e.g. in the normal manner.

As shown in FIG. 4, as well as the rasterisation and depth testing sending (surviving) fragments to the latency buffer 47 for rendering, it is also kept track of whether any primitives are (entirely) culled as a result of the rasterisation and depth testing (i.e. such that no fragments for the primitive survive to be rendered), and when a primitive is culled, this is signalled (feedback) 63 to the vertex cache 63.

In response to an indication that a primitive has been culled, the vertex cache sends, as shown in FIG. 4, an attribute shading "kill" (stop) request 64 to the attribute shading process 50 for each vertex of the primitive in question, in response to which "kill' request, any existing attribute shading for the vertex in question is stopped (e.g., and in an embodiment, by terminating the execution thread that is performing that shading). This then allows attribute shading for vertices of culled primitives to be terminated, thereby avoiding performing some or all of that processing in the event it is determined that the vertex in question will not in fact be needed for rendering a fragment (primitive).

Figure 5:
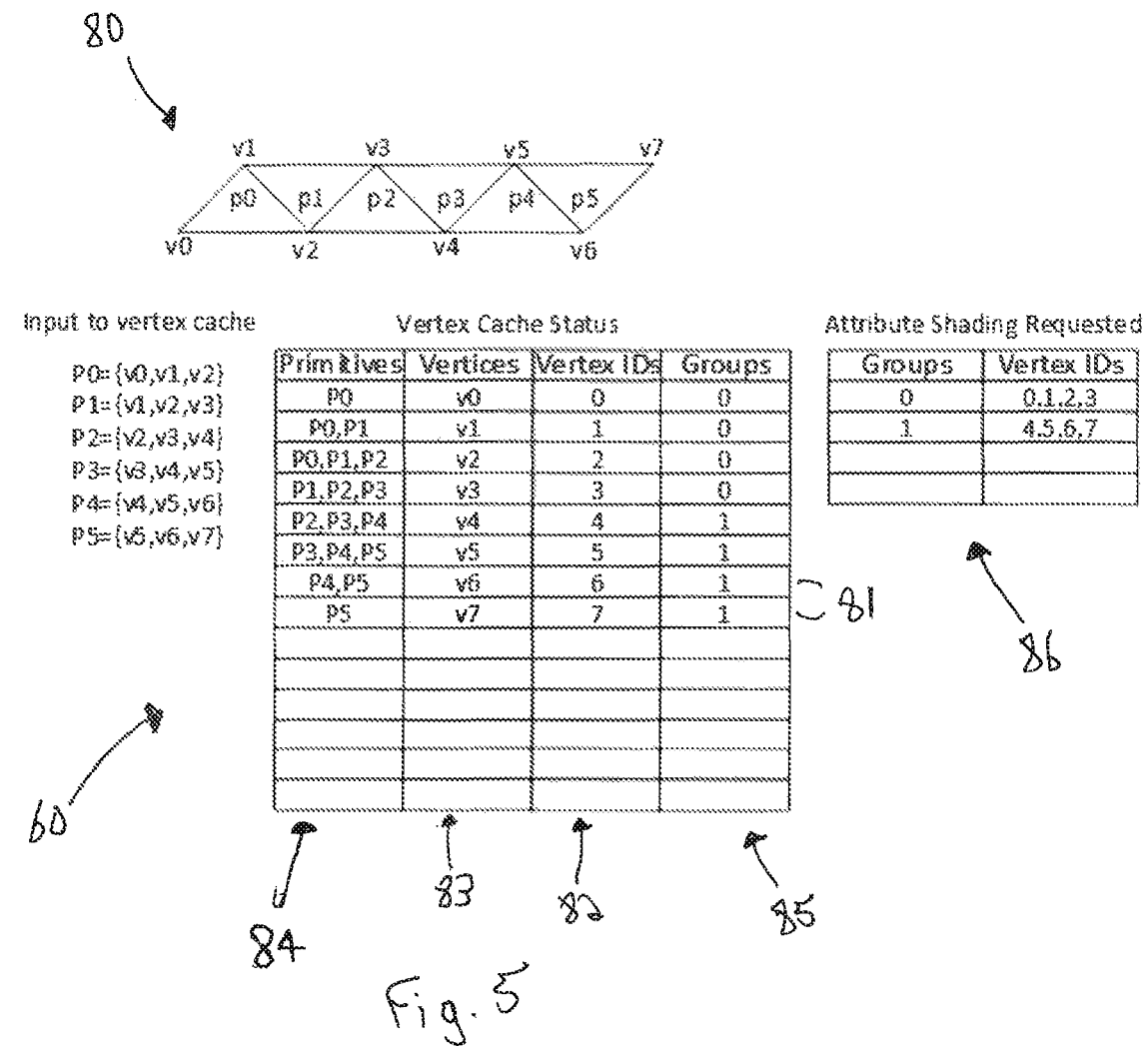
FIGS. 5, 6 and 7 illustrate the control of a second vertex shading operation in the embodiment of FIG. 4.
Figure 6:
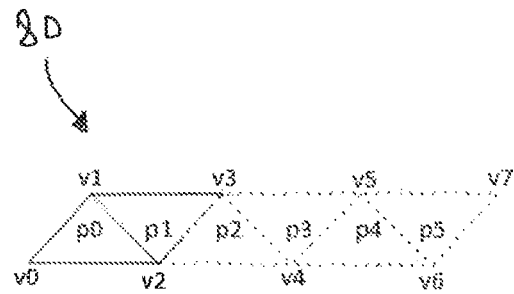
Figure 7:
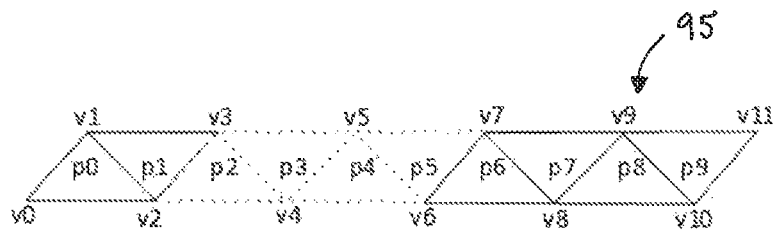

FIGS. 5, 6 and 7 show in more detail the operation of the vertex cache 60 in the embodiment shown in FIG. 4, and in particular how non-position attribute vertex shading is requested and then (potentially) killed in operation of the embodiment shown in FIG. 4, and the corresponding impact on the status of the vertex cache 60.

In particular, these Figures show the generating of the non-position attribute vertex shading requests and "kill" requests, and tracking of the vertex IDs and primitives in the vertex cache, in the embodiment shown in FIG. 4.

FIG. 5 shows an exemplary sequence of six triangles 80, forming a triangle strip, being received in order (i.e. {p0, p1, p2, p3, p4, p5} for processing.

As shown in FIG. 5 each unique vertex 83 for this sequence of primitives 80 is stored as a respective cache entry 81 in the vertex cache 60, and assigned with a (unique) vertex ID 82. (In the example illustrated in FIG. 5, vertex IDs 0 to 7 are assigned, as there are eight unique vertices for the six triangles.)

As shown in FIG. 5, the vertex cache 60 also records 84 and keeps track of which primitives a given vertex is used for.

The vertices are also organised into respective groups 85 of n, in the present embodiment four, vertices, as shown in FIG. 5, as in the present embodiment, non-position attribute vertex shading requests are sent for groups of four vertices at a time.

Thus, as shown in FIG. 5, once the vertices for the six triangles have been added to the vertex cache 60, two non-position attribute shading requests 86 are sent, one for each respective group of four vertices.

As illustrated in FIG. 6, it is then assumed that four of the primitives in the triangle strip 80 (namely p2, p3, p4 and p5) are culled due to depth testing. This information is, as discussed above, sent to the vertex cache 60, and the vertex cache then determines whether all the primitives associated with any of the vertices in the cache have been culled (such that the vertex will not be needed for the existing set of primitives), based on the indication of the primitives associated with each vertex in the vertex cache. For any vertex which is no longer needed (because all the primitives associated with the vertex have been culled), an appropriate "kill" request 91 to stop the non-position attribute vertex shading for that vertex is sent to the non-position attribute vertex shading process. Again, these kill requests are in the present embodiments sent for groups of four vertices together.

In the present example, as illustrated in FIG. 6, it will be determined that vertices v4, v5, v6 and v7 are no longer required as a result of the culling of primitives p2, p3, p4 and p5, and so a kill request for vertex group 1, corresponding to vertex IDs 4, 5, 6, 7, is sent to the non-position attribute vertex shading process to stop the non-position attribute vertex shading for that group of vertices.

As illustrated in FIG. 7, it is then assumed that a further four triangles, i.e. {p6, p7, p8, p9} are received for processing (in that order).

The vertices v6-v11 for those triangles are again stored into the vertex cache 60, but with new and unique vertex IDs (i.e. in this case 8-13) assigned to them (as shown in FIG. 7).

(The vertex IDs of the killed vertices, i.e. 4-7, are not reused for the new or any duplicated vertices to avoid a possible race condition where the earlier non-position attribute shading may be completed before being killed, but the vertex IDs are reused for different vertices in a later shading request.)

As shown in FIG. 7 in response to this these new vertices, a new group of vertex IDs is sent for non-position vertex attribute shading (illustrated as group 2 in FIG. 7), comprising vertices having the (assigned) vertex IDs 8, 9, 10 and 11. It will be noted here that non-position attribute shading is requested again for vertices v6 and v7, as they are now part of a new primitive that has not (yet) been culled.

The remaining vertices v10, v11 (i.e. vertex IDs 12 and 13) for the new primitives will have non-position attribute shading requested from them once two further new vertices are loaded into the vertex cache (to thereby perform a group of four vertices for which the attribute shading can be requested).

Other arrangements would, of course, be possible. For example, attribute shading requests and attribute shading kill requests could be sent for individual vertices, and/or for groups containing different numbers of plural vertices, if desired.

As discussed above, in these embodiments of the technology described herein, an appropriate request (command) is sent to trigger the desired vertex shading operations, such as the position shading operation and the attributes shading operation.

These requests include information needed by the graphics processor and graphics processing pipeline to be able to carry out the vertex shading operation, such as information (an indicator) that identifies the request as being a request to trigger the desired vertex shading operation, and/or an identifier that identifies the request, and information indicating the vertex or vertices to which the request relates.

This information may comprise, for example, one or more of: a job (task) identifier (ID), an index identifier (ID), an instance identifier (ID), and a memory identifier (ID). The job ID in an embodiment identifies the graphics processing job (task), e.g., and in an embodiment, the draw call, that the vertex or group of vertices in question relate to, and in an embodiment identifies, in an embodiment uniquely, the shader program to run (to be executed), and/or the configuration of attributes and/or stacks, etc., and/or other information, that is required to run (execute) a shader program. This information is in an embodiment static for the entire job (task) (e.g. draw call). The index ID and instance ID information in an embodiment indicates the vertex (or vertices) within the job (task) in question. The memory ID information in an embodiment indicates the location in memory at which the output (vertex-shaded attributes data) should be stored. The memory ID could comprise a base address and a request identifier (ID) indicating a memory position offset from the base address.

The requests to trigger a vertex shading operation can be sent to any desired and suitable stage and circuit of the graphics processor and graphics processing pipeline so as to trigger the vertex shading operation.

For example, the requests could be sent directly to a shader core that is configured to execute vertex shading operations. In an embodiment, the requests are sent to a stage/circuit of the graphics processing pipeline/graphics processor that is configured to manage (control) one or more processes of the graphics processing pipeline/graphics processor (and the graphics processor correspondingly in an embodiment comprises a manager/control circuit configured to manage (control) one or more processes of the graphics processing pipeline/graphics processor). In an embodiment the request is sent to a stage/circuit that receives and/or distributes respective processing tasks (jobs) to processing units (functional units) of the graphics processor. For example, the requests can be sent to a job (task) management stage/circuit (a job manager or command stream front end) of the graphics processor, which manager stage/circuit of the graphics processor then triggers the desired vertex shading operation for the vertex or group of vertices in question, e.g., and in an embodiment, by issuing that vertex shading operation to an available shader processing (execution) core.

It will also be appreciated from the above, that in the present embodiments, different vertex shading programs will be executed, e.g. to perform the position shading and the attribute shading, respectively.

The vertex shaders (vertex shading programs) that are executed for the different vertex shading operations can be configured in any desired and suitable manner. They in an embodiment comprise appropriate limited (e.g. lightweight) versions of the vertex shader that has been defined for the graphics processing output (e.g. draw call) in question. For example, for each vertex shading operation, the vertex shading program may comprise only part but not all of the vertex shader that has been defined for the graphics processing output (e.g. draw call) in question.

The configuration of the vertex shaders (vertex shading programs) for the different vertex shading operations can be achieved in any suitable and desired manner. For example, the vertex shader (vertex shading program) supplied by the application that requires the graphics processing (i.e. that has been defined for the graphics processing output in question) may be modified to remove (delete) the attributes that are not to be processed by the vertex shading operation in question and then recompiled.

Figure 8:
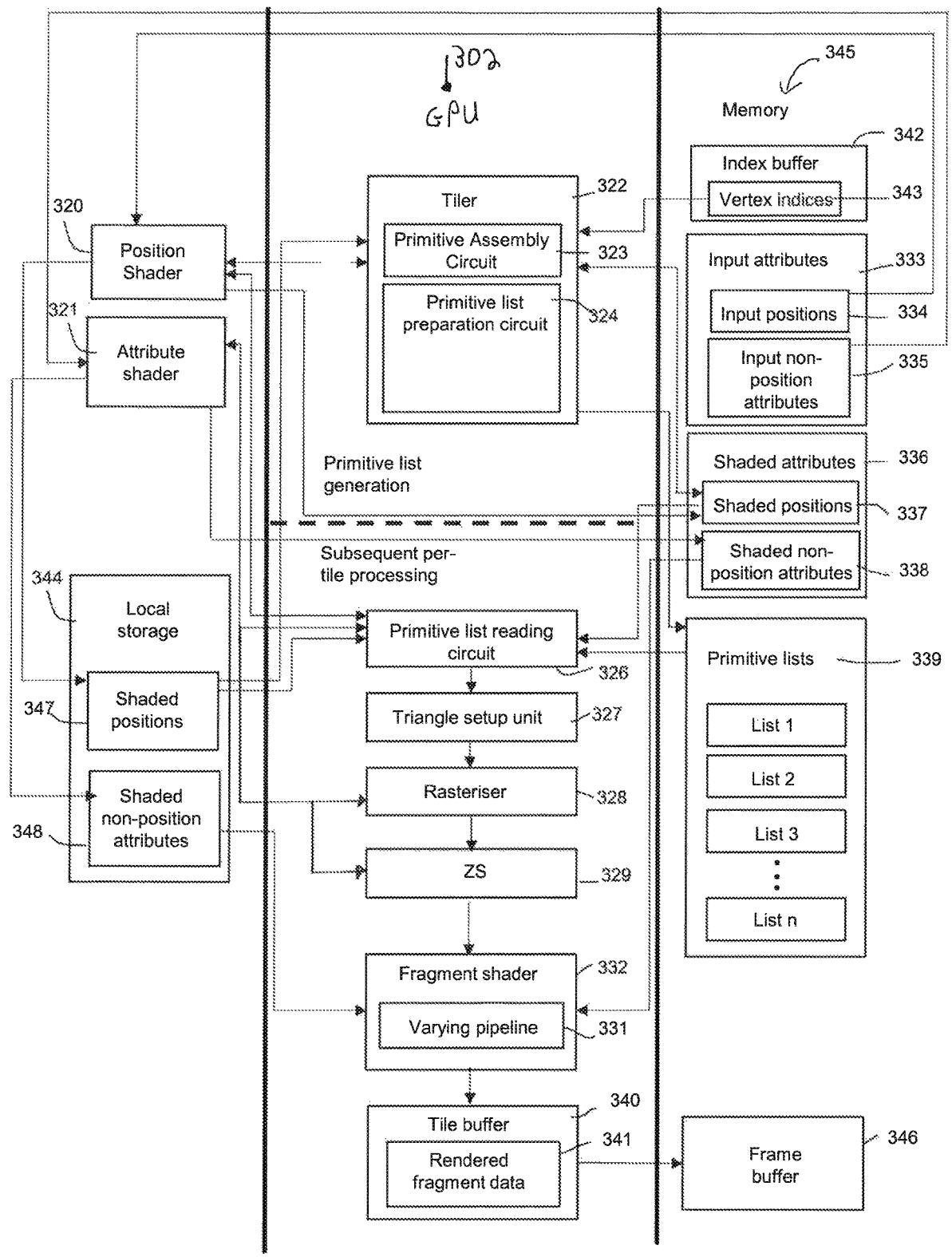
FIG. 8 shows schematically an arrangement of a graphics processor that can operate in accordance with the technology described herein.

FIG. 8 shows schematically a graphics processor 302 that may be operated in accordance with the technology described herein. The graphics processor comprises various processing circuits, comprising inter alia a position shader (position shading circuit) 320, an attribute shader (attribute shading circuit) 321, a tiler (tiling circuit) 322, a primitive list reader (primitive list reading circuit) 326, a triangle setup circuit 327, a rasteriser (rasterising circuit) 328, a depth testing circuit (ZS) 329, and a fragment shader 332 (which includes a varying pipeline 331).

The graphics processor also has local ("on-chip") storage 344, such as a cache, and has access to an external (main) memory 345.

In the present embodiments, the graphics processor 302 performs processing of primitives, such as triangles, in order to generate a render output, such as an image for display. The primitives processed by the graphics processor may comprise a set of primitives (e.g. corresponding to a "draw call" requested by an application executing on a host processor), the set of primitives being formed from an appropriate set of vertices. The set of vertices for the "draw call" may be indicated to the graphics processor in any desired and suitable manner, such as by storing an identifier (e.g. a vertex index 343) for each vertex of the set of vertices in a suitable index buffer 342 in main memory 345 accessible by the graphics processor.

The position shader 320 of the graphics processor is a programmable processing circuit configured to transform input positions 334 of vertices (e.g. corresponding to positions in a "model space") to the render output "screen space", so as to generate processed (shaded) position attributes 337, 347 for the vertices. The attribute shader 321 is a programmable processing circuit configured to receive input non-position attributes 35 of vertices (the non-position attributes, also known as "varyings", comprising, e.g. colour, light, normal, texture coordinates, etc, for the vertices), and to process (transform) the non-position attributes appropriately for the render output so as to generate processed (shaded) non-position attributes 338, 348.

The position shading circuit 320 and attribute shading circuit 321 may comprise separate circuits, however in an embodiment these are formed by the same overall (programmable) shading circuit (and so share circuitry).

The tiler 322 comprises a primitive assembly circuit 323, and a primitive list preparation circuit 324.

The primitive assembly circuit 323 is configured to assemble a set of primitives (e.g. for a draw call) from an appropriate set of vertices. Assembling the set of primitives may be performed in any desired and suitable manner, e.g. comprising reading indices 343 identifying vertices of the set of vertices (e.g. from the index buffer 342), and then determining the vertices for each primitive of the set of primitives based on primitive configuration information. The primitive configuration information indicates how the primitives are to be assembled, e.g. in the form of simple triangles, triangle strips, or triangle fans, etc.

The primitive list preparation circuit 324 determines the primitive list or lists in which to include each primitive in the set of primitives (this process may also be referred to as "binning" the primitives into primitive lists). When determining the primitive list or lists in which to include a primitive, the primitive list preparation circuit uses the shaded (transformed) positions 347 for the vertices of the primitive to determine which region(s) of the render output the primitive falls within (e.g. using bounding box binning), and then includes the primitive in an appropriate list or lists. The primitive lists 339 are stored in the memory 345.

Thus, as shown in FIG. 8, the tiler 322 is able to control the position shader 320 to perform position shading of vertices for this purpose.

After primitive list preparation has been performed for a set of primitives, subsequent processing may be performed using the primitive lists, comprising rendering tiles of the render output. This subsequent processing is performed on a tile-by-tile basis (for each tile separately, e.g. in turn). The subsequent per-tile processing is performed by circuits such as the primitive list reader (primitive list reading circuit) 326, triangle setup unit 327, rasteriser 328, a depth testing circuit 329, and the fragment shader 332.

The primitive list reader 326 is configured to read primitive lists 339 relevant to a tile under consideration (i.e. those primitive lists which correspond to a region of the render output which spans the tile under consideration), and to identify the primitives in those primitive lists. The primitive list reader 326 is also configured to request (trigger) shading of position attributes for the vertices of a primitive by the position shader, if those shaded attributes are not present in memory 345.

The triangle setup unit 327 performs appropriate triangle setup operations for primitives identified by the primitive list reader 326, such as deriving edge equations for the primitives, determining rates of change of attribute values (e.g. such as colour values) between the vertices of primitives, etc.

The rasteriser 328 rasterises each primitive into fragments, each fragment representing a set of one or more single sampling positions of the render output.

The depth testing circuit 329 performs depth testing to cull fragments which will not be visible in the render output (e.g. which are behind other opaque primitives).

As shown in FIG. 8, the primitive list reading circuit 326, rasteriser 328 and depth testing circuit 329 are all able to communicate with the attribute shader 321, to send requests for attribute shading and, where appropriate, "kill" requests, e.g. in accordance with the operation of one or both of the embodiments shown in FIGS. 3 and 4.

Fragment shading 332 is performed to generate rendered fragment data 341 for the fragments received from the rasteriser 328 (and that pass the depth test). As shown in FIG. 8, the fragment shader 332 may use a varying pipeline 331 to interpolate non-position attributes 348 for the fragments received from the rasterizer 328 (and that pass the depth test) when generating the rendered fragment data 341.

The rendered fragment data 341 is stored in a tile buffer 340 (in the local storage 344 of the graphics processor 302).

Once the processing for a tile is complete (once all the relevant primitives for the tile have been processed), the rendered fragment data 341 stored in the tile buffer 340 is written to a frame buffer 346 in the memory 345 which stores the overall render output (frame (image)), e.g. to be displayed on a display (e.g. a display screen).

As noted above, the graphics processor 302 comprises local ("on-chip") storage 344, and has access to a main memory 345. As shown in FIG. 8, vertex indices 343 for a set of vertices for a set of primitives which are to be processed to form a render output, and input attributes 333 for vertices of the set of vertices (which are, for example, provided by the graphics processor driver and/or an application running on a host system (microprocessor) of the graphics processor 302) may be stored in main memory 345. The main memory may also store the primitive lists 339 which contain data, commands etc. for respective primitives, as generated by the primitive list preparation circuit 324.

As shown in FIG. 8, and as discussed above, depending on the processing which is performed, shaded position attributes and shaded non-position attributes may be stored in main memory 345 or in local storage 344.

Figure 9:
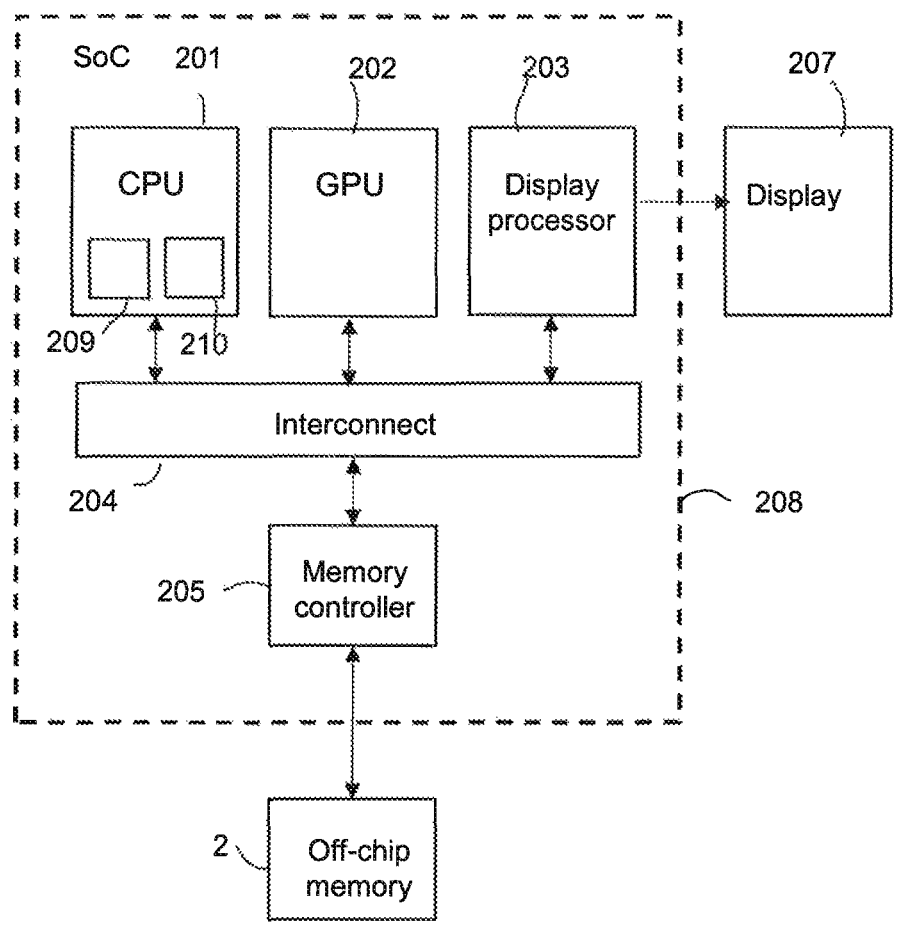
FIG. 9 shows an exemplary data processing system in which the technology described herein may be implemented.

FIG. 9 shows an exemplary data processing system in which the technology described herein may be implemented. The data processing system shown in FIG. 9 is an exemplary system on chip (SoC) graphics processing system 200 that comprises a host processor comprising a central processing unit (CPU) 201, a graphics processor (GPU) 202, a display processor 203, and a memory controller 205. As shown in FIG. 9, these units communicate via an interconnect 204 and have access to off-chip memory 2. In this system, the graphics processor 202 will render frames (images) to be displayed, and the display processor 203 will then provide the frames to a display panel 207 for display.

In use of this system, an application 209 (e.g. such as a game), executing on the host processor (CPU) 201 will, for example, require the display of frames on the display panel 207. To do this, the application will submit appropriate commands and data to a driver 210 for the graphics processor 202 that is executing on the CPU 201. The driver 210 will then generate appropriate commands and data to cause the graphics processor 202 to render appropriate frames for display and to store those frames in appropriate frame buffers, e.g. in the main memory 2. The display processor 203 will then read those frames into a buffer for the display from where they are then read out and displayed on the display panel 207 of the display.

It can be seen from the above that the technology described herein, in its embodiments at least, can reduce the amount of redundant non-position attribute vertex shading that is performed in a tile-based graphics processing system. This is achieved, in the embodiments of the technology described herein at least, by deferring the non-position attribute vertex shading operation until the rasterization and early culling (e.g. depth) testing stage of the graphics processing pipeline and controlling that vertex shading based on the results of the culling (e.g. depth) testing prior to rendering.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of performing tile-based graphics processing, in which a render output to be generated is processed as a plurality of tiles for rendering purposes, the method comprising:
performing a first vertex shading operation on one or more vertices of a set of vertices for a set of primitives to be processed for generating a render output, each vertex having associated with it a plurality of vertex attributes, the first vertex shading operation generating vertex shaded attribute data for at least some but not all of the plurality of vertex attributes of the one or more vertices, and including at least generating vertex shaded position data for the one or more vertices; and
using the vertex shaded position data generated by the first vertex shading operation to prepare primitive lists indicative of which primitives of the set of primitives should be rendered for respective rendering tiles that the render output being generated has been divided into for rendering purposes;
the method further comprising:
when processing primitives for a tile of the render output being generated:
rasterising primitives to be processed for the tile to generate corresponding fragments for rendering the primitives;
performing culling testing before rendering fragments; and
subjecting fragments generated by the rasteriser that pass the culling testing to rendering;
wherein the method further comprises:
performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser.

2. The method of claim 1, wherein the first vertex shading operation only generates vertex shaded position data for the one or more vertices.

3. The method of claim 1, wherein:
the second vertex shading operation operates to vertex shade one or more non-position attributes for the vertices.

4. The method of claim 1, wherein:
the vertex shaded attributes data generated by the second vertex shading operation is stored in an intermediate storage of the graphics processor, without being written to main memory.

5. The method of claim 1, wherein performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser comprises:
starting the second vertex shading operation for vertices based on the results of the culling testing before rendering fragments generated by the rasteriser.

6. The method of claim 1, comprising:
starting the second vertex shading operation for vertices after the rasterisation and the culling testing before rendering, and based on, and in response to, fragments that pass the culling testing before rendering.

7. The method of claim 1, wherein performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser comprises:
stopping a second vertex shading operation that is being performed for a vertex based on the results of the culling testing before rendering fragments generated by the rasteriser.

8. The method of claim 1, wherein performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser comprises:
determining, based on the results of the culling testing before rendering fragments, whether the second vertex shading operation for a vertex for which the second vertex shading operation has been requested should be stopped, and in response to determining that the second vertex shading operation for a vertex should be stopped, sending a request that the second vertex shading operation for the vertex be stopped.

9. The method of claim 1, wherein:
the culling testing before rendering fragments comprises depth testing before rendering fragments.

10. A graphics processor operable to perform tile-based graphics processing, in which a render output to be generated is processed as a plurality of tiles for rendering purposes, the graphics processor comprising:
a vertex shader circuit configured to perform a first vertex shading operation on one or more vertices of a set of vertices for a set of primitives to be processed for generating a render output, each vertex having associated with it a plurality of vertex attributes, the first vertex shading operation generating vertex shaded attribute data for at least some but not all of the plurality of vertex attributes of the one or more vertices, and including at least generating vertex shaded position data for the one or more vertices; and
a tiling circuit configured to use the vertex shaded position data generated by the first vertex shading operation to prepare primitive lists indicative of which primitives of a set of primitives should be rendered for respective rendering tiles that a render output being generated has been divided into for rendering purposes;
a rasteriser circuit configured to rasterise primitives to be processed for a tile of a render output being generated to generate corresponding fragments for rendering the primitives;
a culling testing circuit configured to perform culling testing prior to rendering fragments generated by the rasteriser; and
a rendering circuit configured to render fragments generated by the rasteriser that pass the culling testing;

wherein the graphics processor further comprises:
a control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser.

11. The graphics processor of claim 10, wherein the first vertex shading operation only generates vertex shaded position data for the one or more vertices.

12. The graphics processor of claim 10, wherein:
the second vertex shading operation operates to vertex shade one or more non-position attributes for the vertices.

13. The graphics processor of claim 10, wherein:
the graphics processor is configured to store the vertex shaded attributes data generated by the second vertex shading operation in an intermediate storage of the graphics processor.

14. The graphics processor of claim 10, wherein the control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser is configured to:
trigger the second vertex shading operation for vertices based on the results of the culling testing before rendering fragments generated by the rasteriser.

15. The graphics processor of claim 10, wherein the control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser is configured to:
trigger the second vertex shading operation for vertices after the rasterisation and the culling testing before rendering, and based on, and in response to, fragments that pass the culling testing before rendering.

16. The graphics processor of claim 10, wherein the control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser is configured to:
stop a second vertex shading operation that is being performed for a vertex based on the results of the culling testing before rendering fragments generated by the rasteriser.

17. The graphics processor of claim 10, wherein the control circuit configured to control the performing of a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser is configured to:
determine, based on the results of the culling testing before rendering fragments, whether the second vertex shading operation for a vertex for which the second vertex shading operation has been requested should be stopped, and in response to determining that the second vertex shading operation for a vertex should be stopped, send a request that the second vertex shading operation for the vertex be stopped.

18. The graphics processor of claim 17, wherein the control circuit is configured to:
determine that the second vertex shading operation for a vertex should be stopped in response to a primitive that uses the vertex being culled as a result of the culling testing before rendering.

19. The graphics processor of claim 10, wherein:
the culling testing before rendering fragments comprises depth testing before rendering fragments.

20. A non-transitory computer readable storage medium comprising computer software code which when executing on at least one processor performs a method of performing tile-based graphics processing, in which a render output to be generated is processed as a plurality of tiles for rendering purposes, the method comprising:
performing a first vertex shading operation on one or more vertices of a set of vertices for a set of primitives to be processed for generating a render output, each vertex having associated with it a plurality of vertex attributes, the first vertex shading operation generating vertex shaded attribute data for at least some but not all of the plurality of vertex attributes of the one or more vertices, and including at least generating vertex shaded position data for the one or more vertices; and
using the vertex shaded position data generated by the first vertex shading operation to prepare primitive lists indicative of which primitives of the set of primitives should be rendered for respective rendering tiles that the render output being generated has been divided into for rendering purposes;
the method further comprising:
when processing primitives for a tile of the render output being generated:
rasterising primitives to be processed for the tile to generate corresponding fragments for rendering the primitives;
performing culling testing before rendering fragments; and
subjecting fragments generated by the rasteriser that pass the culling testing to rendering;
wherein the method further comprises:
performing a second vertex shading operation for vertices of primitives for which fragments have been generated by the rasteriser prior to rendering the graphics fragments, to generate vertex shaded attribute data for at least one other vertex attribute of the plurality of vertex attributes of the vertices for which vertex attribute data was not generated in the first vertex shading operation, based on the results of the culling testing before rendering fragments generated by the rasteriser.

* * * * *